United States Patent
Doepke et al.

(10) Patent No.: US 9,762,794 B2
(45) Date of Patent: Sep. 12, 2017

(54) POSITIONAL SENSOR-ASSISTED PERSPECTIVE CORRECTION FOR PANORAMIC PHOTOGRAPHY

(75) Inventors: Frank Doepke, San Jose, CA (US); Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 13/109,878

(22) Filed: May 17, 2011

(65) Prior Publication Data

US 2012/0293608 A1 Nov. 22, 2012

(51) Int. Cl.
H04N 5/225 (2006.01)
H04N 5/232 (2006.01)

(52) U.S. Cl.
CPC ............... *H04N 5/23238* (2013.01)

(58) Field of Classification Search
CPC ......... H04N 5/228; H04N 5/225; G03B 37/02
USPC ...... 348/36, 218.1, 222.1; 382/248
See application file for complete search history.

(56) References Cited

U.S. PATENT DOCUMENTS

| | | | |
|---|---|---|---|
| 5,237,413 A | 8/1993 | Israelsen |
| 6,075,905 A | 6/2000 | Herman |
| 6,094,215 A | 7/2000 | Sundahl et al. |
| 6,167,404 A | 12/2000 | Morcos |
| 6,243,103 B1 | 6/2001 | Takiguchi |
| 6,304,284 B1 | 10/2001 | Dunton et al. |
| 6,978,052 B2 | 12/2005 | Beged-Dov et al. |
| 7,006,124 B2 | 2/2006 | Peleg |
| 7,409,105 B2 | 8/2008 | Jin et al. |
| 7,424,218 B2 | 9/2008 | Baudisch et al. |
| 7,460,730 B2 | 12/2008 | Pal |

(Continued)

FOREIGN PATENT DOCUMENTS

| | | |
|---|---|---|
| CN | 101158889 A | 4/2008 |
| CN | 101228477 A | 7/2008 |

(Continued)

OTHER PUBLICATIONS

U.S. Appl. No. 13/109,875, filed May 17, 2011, Bhogal et al.

(Continued)

*Primary Examiner* — Neil Mikeska
(74) *Attorney, Agent, or Firm* — Blank Rome LLP

(57) ABSTRACT

This disclosure pertains to devices, methods, and computer readable media for performing positional sensor-assisted panoramic photography techniques in handheld personal electronic devices. Generalized steps that may be used to carry out the panoramic photography techniques described herein include, but are not necessarily limited to: 1.) acquiring image data from the electronic device's image sensor; 2.) performing "motion filtering" on the acquired image data, e.g., using information returned from positional sensors of the electronic device to inform the processing of the image data; 3.) performing image registration between adjacent captured images; 4.) performing geometric corrections on captured image data, e.g., due to perspective changes and/or camera rotation about a non-center of perspective (COP) camera point; and 5.) "stitching" the captured images together to create the panoramic scene, e.g., blending the image data in the overlap area between adjacent captured images. The resultant stitched panoramic image may be cropped before final storage.

57 Claims, 21 Drawing Sheets

(56) References Cited

U.S. PATENT DOCUMENTS

| | | |
|---|---|---|
| 7,577,314 B2 | 8/2009 | Zhou |
| 7,590,335 B2 | 9/2009 | Kobayashi |
| 7,627,225 B2 | 12/2009 | Shimosato et al. |
| 7,656,428 B2 | 2/2010 | Trutna, Jr. |
| 7,656,429 B2 | 2/2010 | Larson |
| 7,746,404 B2 | 6/2010 | Deng et al. |
| 7,796,871 B2 | 9/2010 | Park et al. |
| 7,844,130 B2 | 11/2010 | Dong |
| 7,912,337 B2 | 3/2011 | Souchard |
| 8,121,809 B2 | 2/2012 | Mealy |
| 8,285,079 B2 | 10/2012 | Robertson |
| 8,310,522 B2 | 11/2012 | Jeong |
| 8,311,355 B2 | 11/2012 | Brunner |
| 8,379,054 B2 | 2/2013 | Katayama |
| 8,957,944 B2 | 2/2015 | Doepke |
| 2002/0126913 A1 | 9/2002 | Kotake |
| 2002/0141002 A1 | 10/2002 | Takano |
| 2002/0196353 A1 | 12/2002 | Nakahira |
| 2004/0001639 A1 | 1/2004 | Ohno |
| 2004/0066449 A1 | 4/2004 | Givon |
| 2004/0155968 A1 | 8/2004 | Cheatle |
| 2004/0201705 A1 | 10/2004 | Lin |
| 2004/0233274 A1 | 11/2004 | Uyttendaele |
| 2005/0088534 A1 | 4/2005 | Shen |
| 2005/0168593 A1 | 8/2005 | Akizuki et al. |
| 2006/0114363 A1 | 6/2006 | Kang et al. |
| 2006/0115181 A1 | 6/2006 | Deng |
| 2006/0215930 A1 | 9/2006 | Terui |
| 2006/0224997 A1 | 10/2006 | Wong et al. |
| 2006/0268130 A1 | 11/2006 | Williams et al. |
| 2006/0280429 A1 | 12/2006 | Shimosato |
| 2006/0291747 A1 | 12/2006 | Peterson |
| 2007/0019882 A1 | 1/2007 | Tanaka et al. |
| 2007/0025723 A1 | 2/2007 | Baudisch |
| 2007/0081081 A1* | 4/2007 | Cheng .................. 348/218.1 |
| 2007/0085913 A1 | 4/2007 | Ketelaars |
| 2007/0097266 A1 | 5/2007 | Souchard |
| 2007/0236513 A1 | 10/2007 | Hedenstroem et al. |
| 2007/0237421 A1 | 10/2007 | Luo et al. |
| 2007/0237423 A1 | 10/2007 | Tico |
| 2007/0258656 A1 | 11/2007 | Arabi |
| 2008/0056612 A1 | 3/2008 | Park |
| 2008/0215286 A1 | 9/2008 | Mealy |
| 2008/0253685 A1* | 10/2008 | Kuranov ............ G06T 3/4038 |
| | | 382/284 |
| 2008/0309772 A1 | 12/2008 | Ikeda |
| 2009/0021576 A1 | 1/2009 | Linder |
| 2009/0058989 A1 | 3/2009 | Kim |
| 2009/0190803 A1 | 7/2009 | Neghina |
| 2009/0208062 A1 | 8/2009 | Sorek et al. |
| 2009/0231447 A1 | 9/2009 | Paik et al. |
| 2009/0244404 A1 | 10/2009 | Park |
| 2010/0053303 A1 | 3/2010 | Hayashi |
| 2010/0054628 A1 | 3/2010 | Levy |
| 2010/0097442 A1 | 4/2010 | Lablans |
| 2010/0097444 A1* | 4/2010 | Lablans ................. G03B 35/00 |
| | | 348/46 |
| 2010/0141737 A1 | 6/2010 | Li |
| 2010/0165087 A1 | 7/2010 | Corso |
| 2010/0188579 A1 | 7/2010 | Friedman |
| 2010/0309336 A1 | 12/2010 | Brunner |
| 2010/0328512 A1* | 12/2010 | Davidovici ............ H04N 3/155 |
| | | 348/302 |
| 2011/0002544 A1 | 1/2011 | Oshima |
| 2011/0043604 A1 | 2/2011 | Peleg et al. |
| 2011/0058014 A1 | 3/2011 | Yamashita |
| 2011/0058015 A1 | 3/2011 | Moriyama |
| 2011/0110605 A1* | 5/2011 | Cheong .................. 382/284 |
| 2011/0116767 A1 | 5/2011 | Souchard |
| 2011/0129126 A1 | 6/2011 | Begeja |
| 2011/0141227 A1 | 6/2011 | Bigioi |
| 2011/0141300 A1* | 6/2011 | Stec et al. ................ 348/222.1 |
| 2011/0157386 A1* | 6/2011 | Ishii ........................ 348/211.4 |
| 2011/0216156 A1 | 9/2011 | Bigioi |
| 2011/0234750 A1 | 9/2011 | Lai |
| 2011/0267544 A1 | 11/2011 | Mei |
| 2011/0304688 A1* | 12/2011 | Ge .......................... G03B 37/04 |
| | | 348/36 |
| 2012/0076358 A1 | 3/2012 | Meadow |
| 2012/0133639 A1 | 5/2012 | Kopf |
| 2012/0155786 A1 | 6/2012 | Zargarpour |
| 2012/0169840 A1 | 7/2012 | Yamashita |
| 2012/0229595 A1 | 9/2012 | Miller |
| 2012/0263397 A1 | 10/2012 | Kimura |
| 2012/0274739 A1 | 11/2012 | Li |
| 2012/0293607 A1 | 11/2012 | Bhogal |
| 2012/0293608 A1 | 11/2012 | Doepke |
| 2012/0314945 A1 | 12/2012 | Cha |
| 2013/0004100 A1 | 1/2013 | Putraya |
| 2013/0033568 A1 | 2/2013 | Kim |
| 2013/0063555 A1 | 3/2013 | Matsumoto |
| 2013/0236122 A1 | 9/2013 | Drouot |

FOREIGN PATENT DOCUMENTS

| | | |
|---|---|---|
| CN | 101379513 A | 3/2009 |
| CN | 100524187 C | 8/2009 |
| CN | 101600113 A | 12/2009 |
| CN | 101668118 A | 3/2010 |
| CN | 102037719 A | 4/2011 |
| EP | 0592136 | 4/1994 |
| EP | 1940152 | 12/2006 |
| EP | 2018049 | 1/2009 |
| JP | 2009290827 A | 12/2009 |
| JP | 2011066635 A | 3/2011 |
| WO | 9951027 | 10/1999 |
| WO | 2004049257 | 6/2004 |
| WO | 2006048875 | 5/2006 |
| WO | 2009/094661 | 7/2009 |
| WO | 2010025309 | 3/2010 |
| WO | 2011033968 A1 | 3/2011 |
| WO | 2011039904 A1 | 4/2011 |

OTHER PUBLICATIONS

U.S. Appl. No. 13/109,883, filed May 17, 2011, Doepke et al.
U.S. Appl. No. 13/109,889, filed May 17, 2011, Doepke.
U.S. Appl. No. 13/109,941, filed May 17, 2011, Doepke et al.
U.S. Appl. No. 13/151,149, filed Jun. 1, 2011, Doepke et al.
"Panoramic Image Projections", http://www.cambridgeincolour.com/tutorials/image-projections.htm 9 pages, May 12, 2011.
"Photo Stitching Digital Panoramas", http://www.cambridgeincolour.com/tutorials/digital-panoramas.htm 11 pages, May 12, 2011.
"Using Photo Stitching Software", http://www.cambridgeincolour.com/tutorials/photo-stitching-software.htm 9 pages, May 12, 2011.
Joshi, Neel, et al., "Image Deblurring using Inertial Measurement Sensors", ACM SIGGRAPH, New York, NY, 8 pages, Jul. 2010.
PCT Search Report and Search Opinion for PCT Application No. PCT/US2012/034625, dated Jul. 31, 2012, 10 pages.
International Search Report and Search Opinion for PCT Application No. PCT/US2012/033010, Dated Jun. 19, 2012, 9 pages.
U.S. Appl. No. 13/109,878, filed May 17, 2011, Doepke.
International Search Report and Search Opinion for PCT Application No. PCT/US2012/033010, dated May 17, 2012, 9 pages.
U.S. Appl. No. 13/489,950, filed Jun. 6, 2012, Tico.
U.S. Appl. No. 13/490,183, filed Jun. 6, 2012, Tico.
U.S. Appl. No. 13/911,243, filed Jun. 6, 2013, Doepke.
"Rendering by Manifold Hopping." Submitted to Siggraph '2001, Paper No. 194, Catgory: research. pp. 1-10.
Cha, Joon-Hyuk, et al., "Seamless and Fast Panoramic Image Stitching," 2012 IEEE International Conference on Consumer Electronics (ICCE), pp. 29-30.
Efros, Alexei. "Image Blending and Compositing." Computational Photography, CMU, Fall 2010. pp. 1-82.
Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.

(56) References Cited

OTHER PUBLICATIONS

McCann, James, Nancy S. Pollard. "Real-Time Gradient-Domain Painting." Computer Science Department, http://repository.cmu.edu/compsci/1257.
Methods of Adaptive Image Blending and Artifacts Masking for Panorama Creation. Apple. Inc. Camera Algorithm Team. Technical Report TR-2012-001.
Perez, P., Gangnet, M., and Blake, A., 'Poisson Image Editing,' ACM Transactions on Graphics (TOG) Proceedings of ACM SIGGRAPH 2003, vol. 22, iss. 3, pp. 313-318, Jul. 2003.
Yingen Xiong and Kari Pulli, "Fast Panorama Stitching for High-Quality Panoramic Images on Mobile Phones," IEEE Transactions on Consumer Electronics, vol. 56, pp. 298-306 (2010).
"Filter," In "The IEEE Standard Dictionary of Electrical and Electronics Terms—Sixth edition—IEEE STD 100-1996," 1997, IEEE, ISBN: 1-55937-833-6, pp. 408-409.

\* cited by examiner

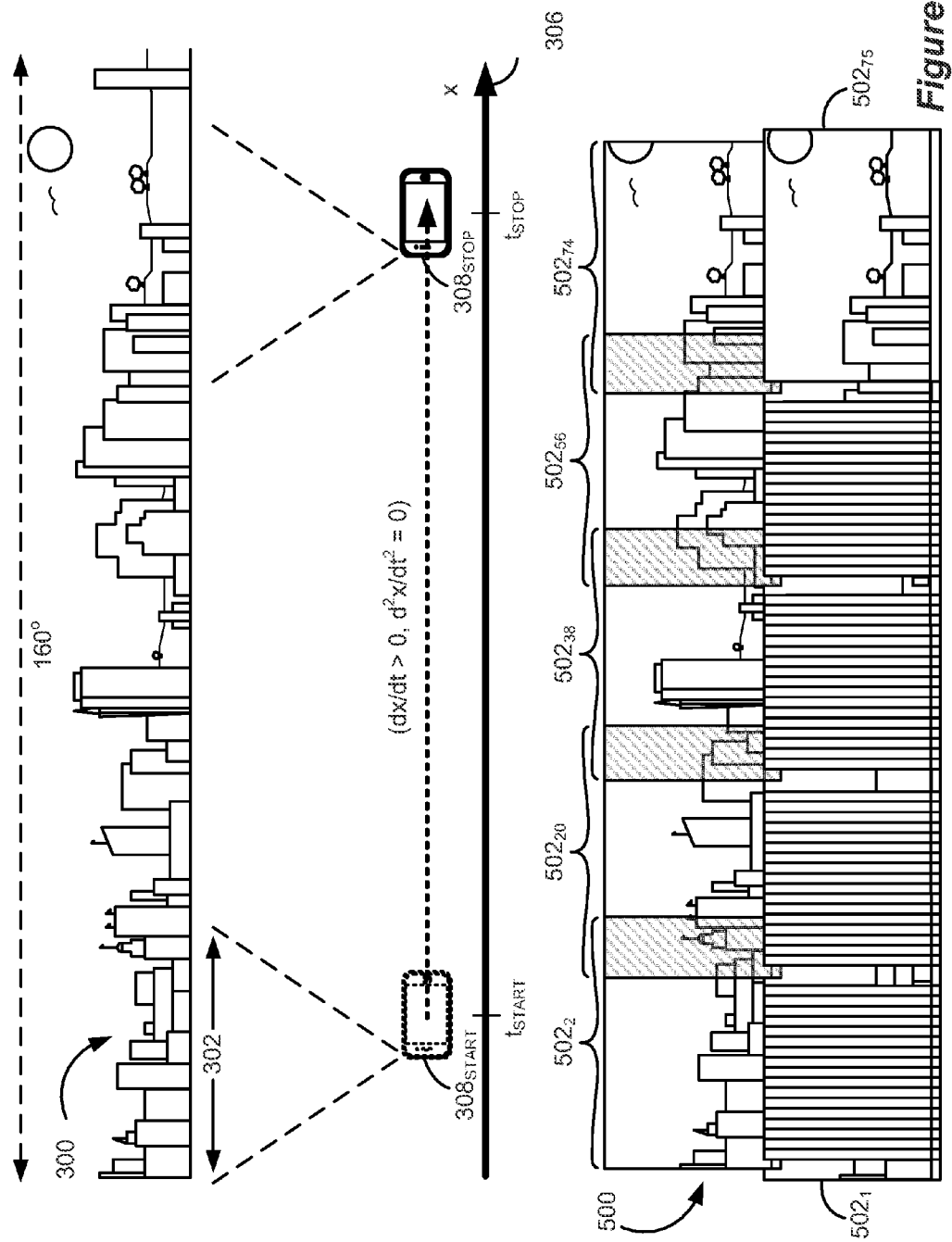

POSITIONAL SENSOR-ASSISTED PERSPECTIVE CORRECTION FOR PANORAMIC PHOTOGRAPHY

CROSS-REFERENCE TO RELATED APPLICATIONS

This application is related to commonly-assigned applications having U.S. patent application Ser. Nos. 13/109,875, 13/109,883, 13/109,889, and 13/109,941, each of which applications was filed on May 17, 2011, and each of which is hereby incorporated by reference in its entirety.

BACKGROUND

The disclosed embodiments relate generally to panoramic photography. More specifically, the disclosed embodiments relate to techniques for improving panoramic photography for handheld personal electronic devices with image sensors.

Panoramic photography may be defined generally as a photographic technique for capturing images with elongated fields of view. An image showing a field of view approximating, or greater than, that of the human eye, e.g., about 160° wide by 75° high, may be termed "panoramic." Thus, panoramic images generally have an aspect ratio of 2:1 or larger, meaning that the image being at least twice as wide as it is high (or, conversely, twice as high as it is wide, in the case of vertical panoramic images). In some embodiments, panoramic images may even cover fields of view of up to 360 degrees, i.e., a "full rotation" panoramic image.

Many of the challenges associated with taking visually appealing panoramic images are well documented and well-known in the art. These challenges include photographic problems such as: difficulty in determining appropriate exposure settings caused by differences in lighting conditions across the panoramic scene; blurring across the seams of images caused by motion of objects within the panoramic scene; and parallax problems, i.e., problems caused by the apparent displacement or difference in the apparent position of an object in the panoramic scene in consecutive captured images due to rotation of the camera about an axis other than its center of perspective (COP). The COP may be thought of as the point where the lines of sight viewed by the camera converge. The COP is also sometimes referred to as the "entrance pupil." Depending on the camera's lens design, the entrance pupil location on the optical axis of the camera may be behind, within, or even in front of the lens system. It usually requires some amount of pre-capture experimentation, as well as the use of a rotatable tripod arrangement with a camera sliding assembly to ensure that a camera is rotated about its COP during the capture of a panoramic scene. Obviously, this type of preparation and calculation is not desirable in the world of handheld, personal electronic devices and ad-hoc panoramic image capturing.

Other well-known challenges associated with taking visually appealing panoramic images include post-processing problems such as: properly aligning the various images used to construct the overall panoramic image; blending between the overlapping regions of various images used to construct the overall panoramic image; choosing an image projection correction (e.g., rectangular, cylindrical, Mercator) that does not distort photographically important parts of the panoramic photograph; and correcting for perspective changes between subsequently captured images.

Accordingly, there is a need for techniques to improve the capture and processing of panoramic photographs on handheld, personal electronic devices such as mobile phones, personal data assistants (PDAs), portable music players, digital cameras, as well as laptop and tablet computer systems. By accessing information returned from positional sensors embedded in or otherwise in communication with the handheld personal electronic device, for example, micro-electro-mechanical system (MEMS) accelerometers and gyrometers, ore effective panoramic photography techniques, such as those described herein, may be employed to achieve visually appealing panoramic photography results in a way that is seamless and intuitive to the user.

SUMMARY

The panoramic photography techniques disclosed herein are designed to handle a range of panoramic scenes as captured by handheld personal electronic devices. Generalized steps to carry out the panoramic photography techniques described herein include: 1.) acquiring image data from the electronic device's image sensor's image stream (this may come in the form of serially captured image frames as the user pans the device across the panoramic scene); 2.) performing "motion filtering" on the acquired image data (e.g., using information obtained from positional sensors for the handheld personal electronic device to inform the processing of the image data); 3.) performing image registration between adjacent captured images; 4.) performing geometric corrections on captured image data (e.g., due to perspective changes and/or camera rotation about a non-COP point); and 5.) "stitching" the captured images together to create the panoramic scene, i.e., blending the image data in the overlap area between adjacent captured images. Due to image projection corrections, perspective corrections, alignment, and the like, the resultant stitched panoramic image may have an irregular shape. Thus, the resultant stitched panoramic image may optionally be cropped to a rectangular shape before final storage if so desired. Each of these generalized steps will be described in greater detail below.

1. Image Acquisition

Some modern cameras' image sensors may capture image frames at the rate of 30 frames per second (fps), that is, one frame every approximately 0.03 seconds. At this high rate of image capture, and given the panning speed of the average panoramic photograph taken by a user, much of the image data captured by the image sensor is redundant, i.e., overlapping with image data in a subsequently or previously captured image frame. In fact, as will be described in further detail below, in some embodiments it may be advantageous to retain only a narrow "slit" or "slice" of each image frame after it has been captured. In some embodiments, the sift may comprise only the central 12.5% of the image frame. So long as there retains a sufficient amount of overlap between adjacent captured image slits, the panoramic photography techniques described herein are able to create a visually pleasing panoramic result, while operating with increased efficiency due to the large amounts of unnecessary and/or redundant data that may be discarded. Modern image sensors may capture both low dynamic range (LDR) and high dynamic range (HDR) images, and the techniques described herein may be applied to each.

2. Motion Filtering

One of the problems currently faced during ad-hoc panoramic image generation on handheld personal electronic devices is keeping the amount of data that is actually being used in the generation of the panoramic image in line with what the device's processing capabilities are able to handle and the capacities of the device's internal data pathways. By using a heuristic of the camera motion based on previous frame registration, change in acceleration, and change of camera rotation information coming from the device's positional sensor(s), e.g., a gyrometer and/or accelerometer, it is possible to "filter out" image slits that would, due to lack of sufficient change in the camera's position, produce only redundant image data. This filtering is not computationally intensive and reduces the number of image slits that get passed on to the more computationally intensive parts of the panoramic image processing operation. Motion filtering also reduces the memory footprint of the panoramic image processing operation by retaining only the needed portions of the image data.

3. Image Registration

Image registration involves matching features in a set of images or using direct alignment methods to search for image alignments that minimize the sum of absolute differences between overlapping pixels. In the case of panoramic photography, image registration is generally applied between two consecutively captured or otherwise overlapping images. Various known techniques may be used to aid in image registration, such as feature detection and cross-correlation. By accessing information returned from a device's positional sensors, image registration techniques such as feature detection and cross-correlation may be improved and made more efficient. The positional information received from the device sensors may serve as a check against the search vectors calculated between various features or regions in the two images being registered. For instance, the movement of an object within a panoramic scene from one image frame to the next image that opposes the motion of the user's panning may suggest a local search vector that is opposed to the actual motion between the two images. By checking localized search vector information against information received from the device's positional sensors, inconsistent and/or unhelpful segments of the images may be discarded from the image registration calculation, thus making the calculation less computationally intensive and reducing the memory footprint of the panoramic image processing operation.

4. Geometric Correction

Perspective changes between subsequently captured image frames (or image slits) may result in the misalignment of objects located in overlapping areas between successive image frames (or slits). In the techniques described herein, information received from a device's positional sensors, e.g., a MEMS gyroscope, allows for the calculation of the rotational change of the camera from frame to frame. This data may then be used to employ a full perspective correction on the captured image frame. Performing a perspective or other geometric correction on the image data may be a crucial step before the alignment and stitching of successively captured image frames in some instances. Various known warping techniques, such as cubic interpolation or cubic splines (i.e., polynomial interpretation) may be used to correct the perspective and interpolate between successively captured image frames.

5. Image Stitching

The final step in assembling a panoramic image according to some embodiments is the "stitching" together of successively retained image frames. The image frames may be placed into an assembly buffer where the overlapping regions between the images (or portions of images) may be determined, and the image pixel data in the overlapping region may be blended into a final resultant image region according to a blending formula, e.g., a linear, polynomial, or other alpha blending formula. Blending between two successively retained image frames attempts to hide small differences between the frames but may also have the consequence of blurring the image in that area. This is not ideal for any object of interest occurring in the overlapping region, and is particularly undesirable for human faces occurring in the overlapping region, as they can become distorted by the blend, becoming very noticeable to a human observer of the panoramic image. By locating faces in the image frames being stitched, one embodiment of a panoramic photography process described herein avoids blending across a face by creating a scene graph so that the face gets used only from one of the image frames being blended. Due to the large number of overlapping image slits being captured, further refinements may also be employed to the selection of the image frame to use for the human face information, e.g., the presence of the face may be compared across successively retained image slits so that, e.g., a slit where the eyes of the face are open is selected rather than a slit where the eyes of the face are closed.

Thus, in one embodiment described herein, an image processing method is disclosed comprising: receiving a first sequence of images from an image sensor in a device; receiving rotational information for the device; selecting, based at least in part on the rotational information, a subset of the first sequence of images to generate a second sequence of images, combining a portion of each of the second sequence of images so that each portion of each image in the second sequence of images overlaps at least one other portion of one other image in the second sequence of images; and blending each of the overlaps between the portions of the images in the second sequence of images to produce a panoramic image.

In another embodiment described herein, an image processing method is disclosed comprising: performing image registration on a first image, wherein the first image is taken with the device at a first position; receiving data indicative of device movement from the first position to a second position; filtering out a second image from the plurality of images, based at least in part on a determination that the device movement has not exceeded a threshold amount of movement, wherein the second image is taken at the second position; performing image registration on one or more additional images from the plurality of images; and generating the panoramic image using the first image and the one or more additional images.

In yet another embodiment described herein, an image registration method is disclosed comprising: obtaining positional information from a device; obtaining first and second images from the device; aligning a plurality of regions in the first image with a corresponding plurality of regions in the second image to identify a plurality of corresponding regions; determining a search vector for each of the plurality of corresponding regions; selecting only those corresponding regions from the plurality of corresponding regions having a search vector consistent with the positional information to identify a plurality of consistent regions; and registering the first and second images using the plurality of consistent regions.

In still another embodiment described herein, an image registration method is disclosed comprising: receiving a first it mage captured by a device; receiving device movement data from one or more positional sensors; receiving a second image captured by the device; and performing image registration on the second image using the device movement data and the first image, wherein the device movement data provides a search vector used in the act of performing image registration, and wherein the second image is captured by the device at a later point in time than the first image.

In another embodiment described herein, an image processing method is disclosed comprising: obtaining a first image at a first time from a device; obtaining a second image at a second time from the device; receiving positional information from a sensor in the device, the positional information indicating an amount of change in the position of the device between the first and second times; applying a geometric correction to either the first or the second image based on the received positional information; and registering the first image with the second image.

In another embodiment described herein, an image processing method is disclosed comprising receiving image data for a plurality of image frames at a device; receiving sensor data indicative of device movement between the capture of a first one of the plurality of image frames and a second one of the plurality of image frames; and applying a perspective correction to either the first or the second ones of the plurality of image frames based on the received sensor data.

In yet another embodiment described herein, a method to generate panoramic images is disclosed comprising: obtaining a first image having a first region and a second region, the second region including a first representation of a face, the first image stored in a first memory; obtaining a second image having a third region and a fourth region, the third region including a second representation of the face, the second image stored in a second memory; aligning the first and second images so that the second and third regions overlap to generate an overlap region; masking an area corresponding to the first representation of the face in the overlap region to generate a mask region; blending the first and second images in the overlap region, except for the mask region, to generate a blended region; and generating a result image comprising the first region, the fourth region and the blended region wherein the area in the blended region corresponding to the mask region is replaced with the first representation of the face.

In still another embodiment described herein, a method to generate panoramic images is disclosed comprising: receiving data representative of a plurality of images comprising a scene at a device; determining an overlapping region between a first image and a second image from the plurality of images; identifying a feature of interest that is represented at a location in each of the first image and the second image, wherein each of the representations are located in the overlapping region; selecting the representation of the feature of interest from the first; blending between the first image and the second image in the overlapping region to generate a resulting overlapping region; and assembling the first image and the second image, using the resulting overlapping region to replace the overlapping region between the first image and the second image, wherein the act of blending excludes the location of the identified feature of interest, and wherein the selected representation is used in the resulting overlapping region at the location of the identified feature of interest.

In another embodiment described herein, a method to generate panoramic images is disclosed comprising: receiving at a device data representative of a plurality of images; identifying one or more locations in the plurality of images in which one or more faces are located; and blending overlapping regions of the plurality of images to form a panoramic image, wherein the act of blending excludes regions of an image having the one or more face locations in an overlapping region.

Positional sensor-assisted panoramic photography techniques for handheld personal electronic devices in accordance with the various embodiments described herein may be implemented directly by a device's hardware and/or software, thus making these robust panoramic photography techniques readily applicable to any number of electronic devices with appropriate positional sensors and processing capabilities, such as mobile phones, personal data assistants (PDAs), portable music players, digital cameras, as well as laptop and tablet computer systems.

BRIEF DESCRIPTION OF THE DRAWINGS

FIG. 5A illustrates an exemplary panoramic scene as captured by an electronic device panning across the scene with constant velocity, in accordance with one embodiment.

DETAILED DESCRIPTION

This disclosure pertains to devices, methods, and computer readable media for performing positional sensor-assisted panoramic photography techniques in handheld personal electronic devices. Generalized steps may be used to carry out the panoramic photography techniques described herein, including: 1.) acquiring image data from the electronic device's image sensor; 2.) performing "motion filtering" on the acquired image data, e.g., using information obtained from positional sensors of the electronic device to inform the processing of the image data; 3.) performing image registration between adjacent captured images; 4.) performing geometric corrections on captured image data, e.g., due to perspective changes and/or camera rotation about a non-center of perspective (COP) camera point; and 5.) "stitching" the captured images together to create the panoramic scene, e.g., blending the image data in the overlap area between adjacent captured images. The resultant stitched panoramic image may be cropped before final storage if so desired.

The techniques disclosed herein are applicable to any number of electronic devices with optical sensors such as digital cameras, digital video cameras, mobile phones, personal data assistants (PDAs), portable music players, as well as laptop and tablet computer systems.

In the interest of clarity, not all features of an actual implementation are described. It will of course be appreciated that in the development of any actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concepts. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Figure 1:
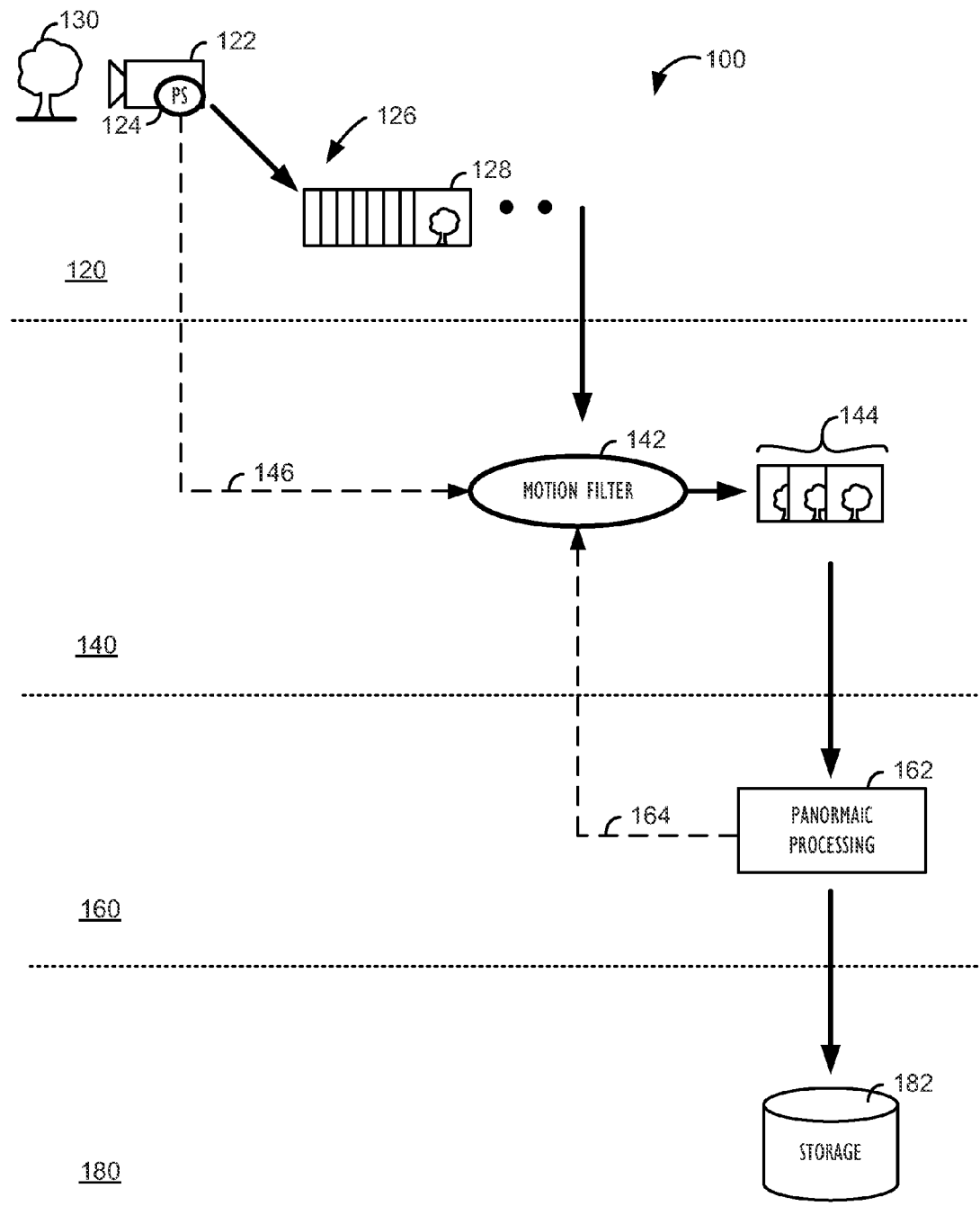
FIG. 1 illustrates a system for panoramic photography with the assistance of positional sensors, in accordance with one embodiment

Referring now to FIG. 1, a system 100 for panoramic photography with the assistance of positional sensors is shown, in accordance with one embodiment. The system 100 as depicted in FIG. 1 is logically broken into four separate layers. Such layers are presented simply as a way to logically organize the functions of the panoramic photography system. In practice, the various layers could be within the same device or spread across multiple devices. Alternately, some layers may not be present at all in some embodiments.

First the Camera Layer 120 will be described. Camera layer 120 comprises a personal electronic device 122 possessing one or more image sensors capable of capturing a stream of image data 126, e.g., in the form of an image stream or video stream of individual image frames 128. In some embodiments, images may be captured by an image sensor of the device 122 at the rate of 30 fps. Device 122 may also comprise positional sensors 124. Positional sensors 124 may comprise, for example, a MEMS gyroscope, which allows for the calculation of the rotational change of the camera device from frame to frame, or a MEMS accelerometer, such as an ultra compact low-power three axes linear accelerometer. An accelerometer may include a sensing element and an integrated circuit (IC) interface able to provide the measured acceleration of the device through a serial interface. As shown in the image frames 128 in image stream 126, tree object 130 has been captured by device 122 as it panned across the panoramic scene. Solid arrows in FIG. 1 represent the movement of image data, whereas dashed line arrows represent the movement of metadata or other information descriptive of the actual image data.

Next, the Filter Layer 140 will be described. Filter layer 140 comprises a motion filter module 142 that may receive input 146 from the positional sensors 124 of device 122. Such information received from positional sensors 124 is used by motion filter module 142 to make a determination of which image frames 128 in image stream 126 will be used to construct the resultant panoramic scene. As may be seen by examining the exemplary motion filtered image stream 144, the motion filter is keeping only one of every roughly three images frames 128 captured by the image sensor of device 122. By eliminating redundant image data in an intelligent and efficient manner, e.g., driven by positional information received from device 122's positional sensors 124, motion filter module 142 may be able to filter out a sufficient amount of extraneous image data such that the Panoramic Processing Layer 160 receives image frames having ideal overlap and is, therefore, able to perform panoramic processing on high resolution and/or low resolution versions of the image data in real time, optionally displaying the panoramic image to a display screen of device 122 as it is being assembled in real time.

Panoramic Processing Layer 160, as mentioned above, possesses panoramic processing module 162 which receives as input the motion filtered image stream 144 from the Filter Layer 140. The panoramic processing module 162 may preferably reside at the level of an application running in the operating system of device 122. Panoramic processing module 162 may perform such tasks as image registration, geometric correction, alignment, and "stitching" or blending, each of which functions will be described in greater detail below. Finally, the panoramic processing module 162 may optionally crop the final panoramic image before sending it to Storage Layer 180 for permanent or temporary storage in storage unit 182. Storage unit 182 may comprise, for example, one or more different types of memory, for example, cache, ROM, and/or RAM. Panoramic processing module 162 may also feedback image registration information 164 to the motion filter module 142 to allow the motion filter module 142 to make more accurate decisions regarding correlating device positional movement to overlap amounts between in successive image frames in the image stream. This feedback of information may allow the motion filter module 142 to more efficiently select image frames for placement into the motion filtered image stream 141.

Figure 2:
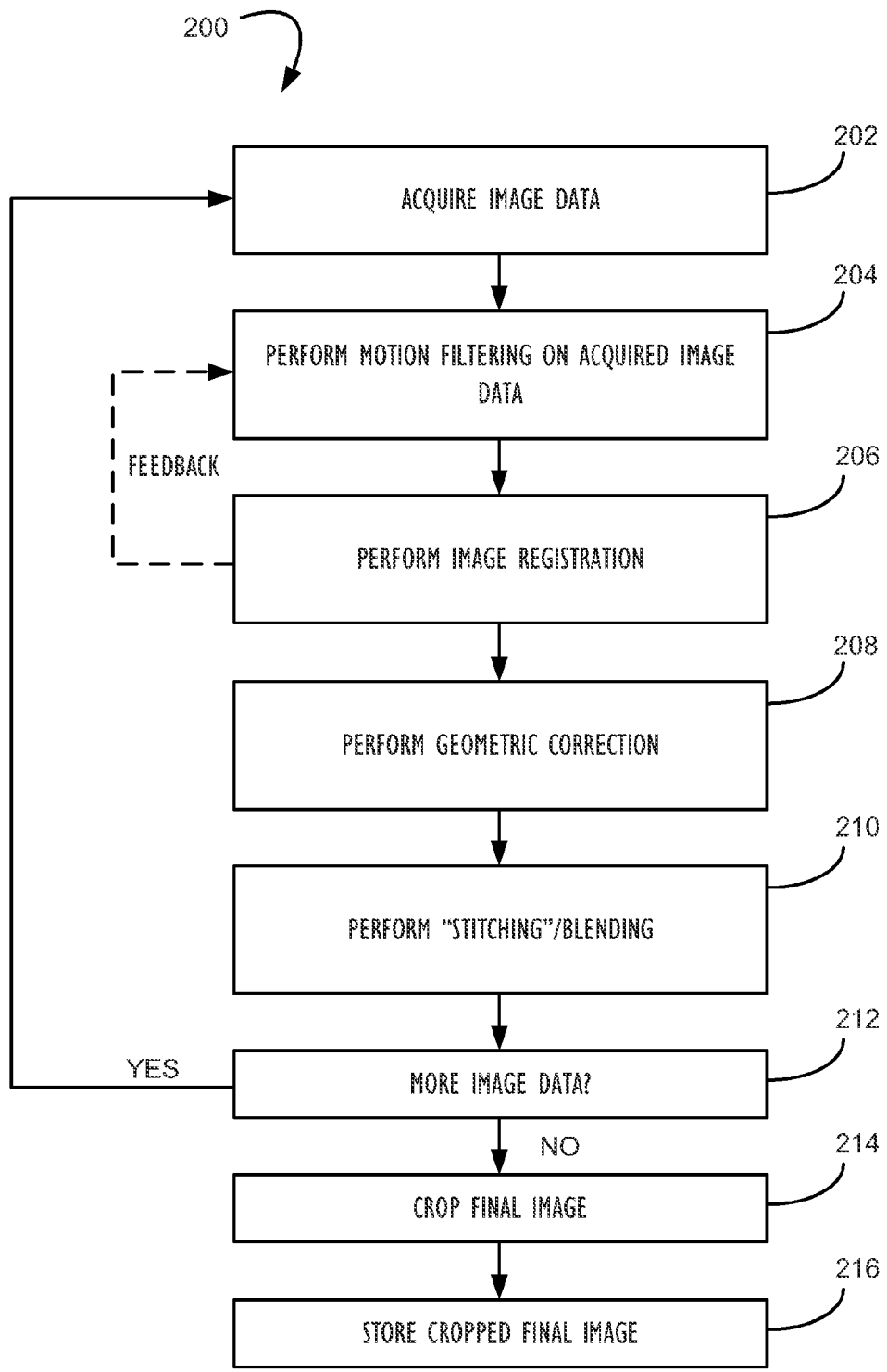
FIG. 2 illustrates a process for creating panoramic images with the assistance of positional sensors, in accordance with one embodiment.

Referring now to FIG. 2, a process 200 for creating panoramic images with the assistance of positional sensors is shown at a high level in flow chart form, in accordance with one embodiment. First, an electronic device, e.g., a handheld personal electronic device comprising one or more image sensors and one or more positional sensors, can capture image data, wherein the captured image data may take the form of an image stream of image frames (Step 202). Next, motion filtering may be performed on the acquired image data, e.g., using the gyrometer or accelerometer to assist in motion filtering decisions (Step 204). Once the motion filtered image stream has been created, the process 200 may attempt to perform image registration between successively captured image frames from the image stream (Step 206). As will be discussed below, the image registration process 206 may be streamlined and made more efficient via the use of information received from positional sensors within the device. Next, any necessary geometric corrections may be performed on the captured image data (Step 208). The need for geometric correction of a captured image frame may be caused by, e.g., movement or rotation of the camera between successively captured image frames, which may change the perspective of the camera and result in parallax errors if the camera is not being rotated around its COP point. Next, the panoramic image process 200 may perform "stitching" and/or blending of the acquired image data (Step 210). As will be explained in greater detail below, common blending errors found in panoramic photography may be avoided by application of some of the techniques disclosed herein. If more image data remains to be appended to the resultant panoramic image (Step 212), the process 200 may return to Step 202 and run through the process 200 to acquire the next image frame that is to be processed and appended to the panoramic image. If instead, no further image data remains at Step 212, the final image may optionally be cropped (Step 214) and/or stored into some form of volatile or non-volatile memory (Step 216). It should also be noted that Step 202, the image acquisition step, may in actuality be happening continuously during the panoramic image capture process, i.e., concurrently with the performance of Steps 204-210. Thus, FIG. 2 is intended to for illustrative purposes only, and not to suggest that the act of capturing image data is a discrete event that ceases during the performance of Steps 204-210. Image acquisition continues until Step 212 when either the user of the camera device indicates a desire to stop the panoramic image capture process or when the camera device runs out of free memory allocated to the process.

Now that the panoramic imaging process 200 has been described at a high level both systemically and procedurally, attention will be turned in greater detail to the process of efficiently and effectively creating panoramic photographs assisted by positional sensors in the image capturing device itself.

Figure 3:
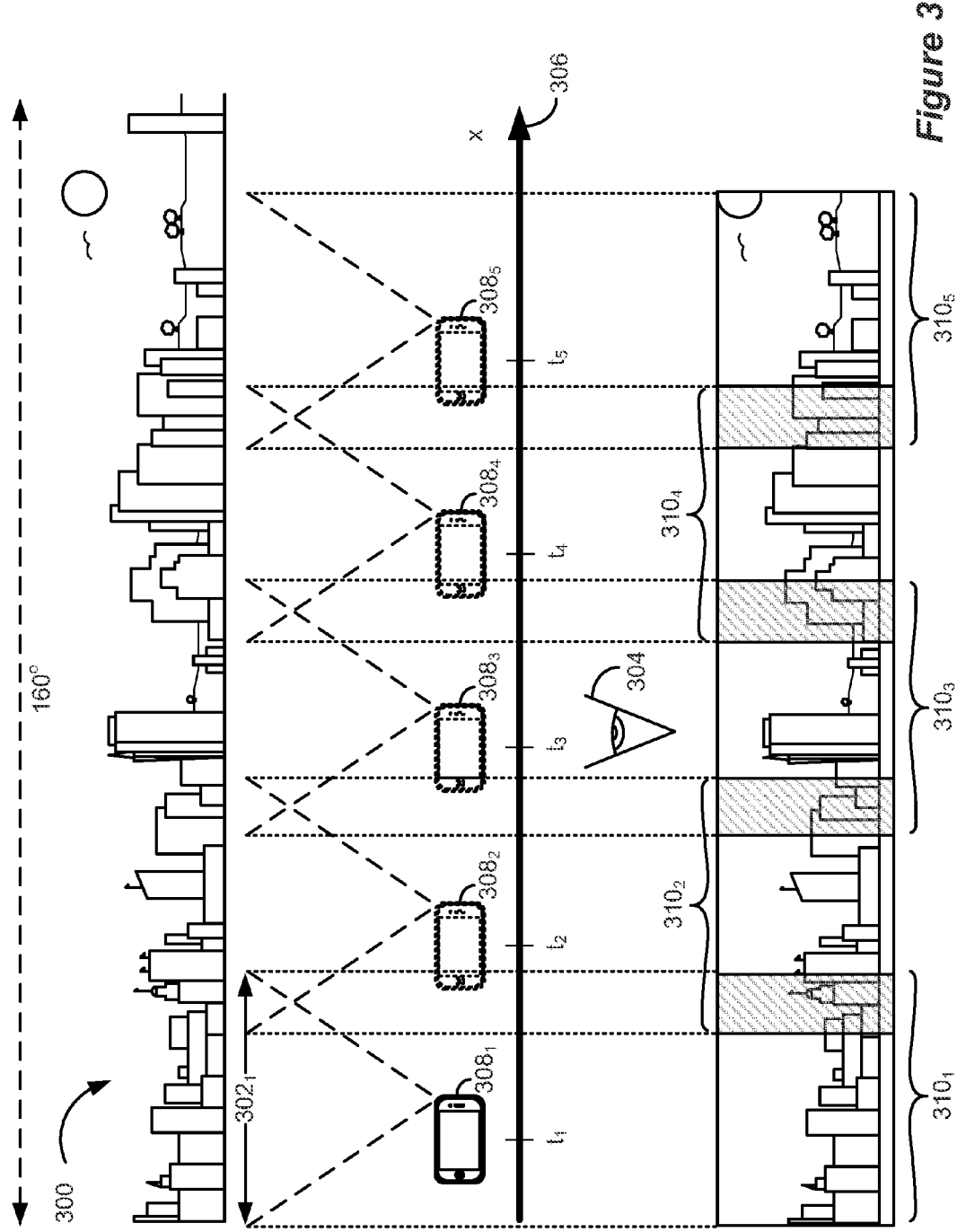
FIG. 3 illustrates an exemplary panoramic scene as captured by an electronic device, in accordance with one embodiment.

Turning now to FIG. 3, an exemplary panoramic scene 300 is shown as captured by an electronic device 308, according to one embodiment. As shown in FIG. 3, panoramic scene 300 comprises a series of architectural works comprising the skyline of a city. City skylines are one example of a wide field of view scene often desired to be captured in panoramic photographs. Ideally, a panoramic photograph may depict the scene in approximately the way that the human eye takes in the scene, i.e., with close to a 180 degree field of view. As shown in FIG. 3, panoramic scene 300 comprises a 160 degree field of view.

Axis 306, which is labeled with an 'x' represents an axis of directional movement of camera device 308 during the capture of panoramic scene 300. As shown in FIG. 3, camera device 308 is translated to the right with respect to the x-axis over a given time interval, $t_1$-$t_5$, capturing successive images of panoramic scene 300 as it moves along its panoramic path. In other embodiments, panoramic sweeps may involve rotation of the camera device about an axis, or a combination of camera rotation around an axis and camera translation along an axis. As shown by the dashed line versions of camera device 308, during the hypothetical panoramic scene capture illustrated in FIG. 3, camera device 308 will be at position $308_1$ at time $t_1$, and then at position $308_2$ at time $t_2$, and so on, until reaching position $308_5$ at time $t_5$, at which point the panoramic path will be completed and the user 304 of camera device 308 will indicate to the device to stop capturing successive images of the panoramic scene 300

Image frames $310_1$-$310_5$ represent the image frames captured by camera device 308 at the corresponding times and locations during the hypothetical panoramic scene capture illustrated in FIG. 3. That is, image frame $310_1$ corresponds to the image frame captured by camera device 308 while at position $308_1$ and time $t_1$. Notice that camera device 308's field of view while at position $308_1$, labeled $302_1$, combined with the distance between user 304 and the panoramic scene 300 being captured dictates the amount of the panoramic scene that may be captured in a single image frame 310. In traditional panoramic photography, a photographer may take a series of individual photos of a panoramic scene at a number of different set locations, attempting to get complete coverage of the panoramic scene while still allowing for enough overlap between adjacent photographs so that they may be aligned and "stitched" together, e.g., using post-processing software running on a computer or the camera device itself. In some embodiments, a sufficient amount of overlap between adjacent photos is desired such that the post-processing software may determine how the adjacent photos align with each other so that they may then be stitched together and optionally blended in their overlapping region to create the resulting panoramic scene. As shown in FIG. 3, the individual frames 310 exhibit roughly 25% overlap with adjacent image frames. In some embodiments, more overlap between adjacent image frames will be desired, depending on memory and processing constraints of the camera device and post-processing software being used.

In the case where camera device 308 is a video capture device, the camera may be capable of capturing fifteen or more frames per second. As will be explained in greater detail below, at this rate of capture, much of the image data may be redundant, and provides much more overlap between adjacent images than is needed by the stitching software to create the resultant panoramic images. As such, the inventors have discovered novel and surprising techniques for positional-sensor assisted panoramic photography that intelligently and efficiently determine which captured image frames may be used in the creation of the resulting panoramic image and which captured image frames may be discarded as overly redundant.

Figure 4:
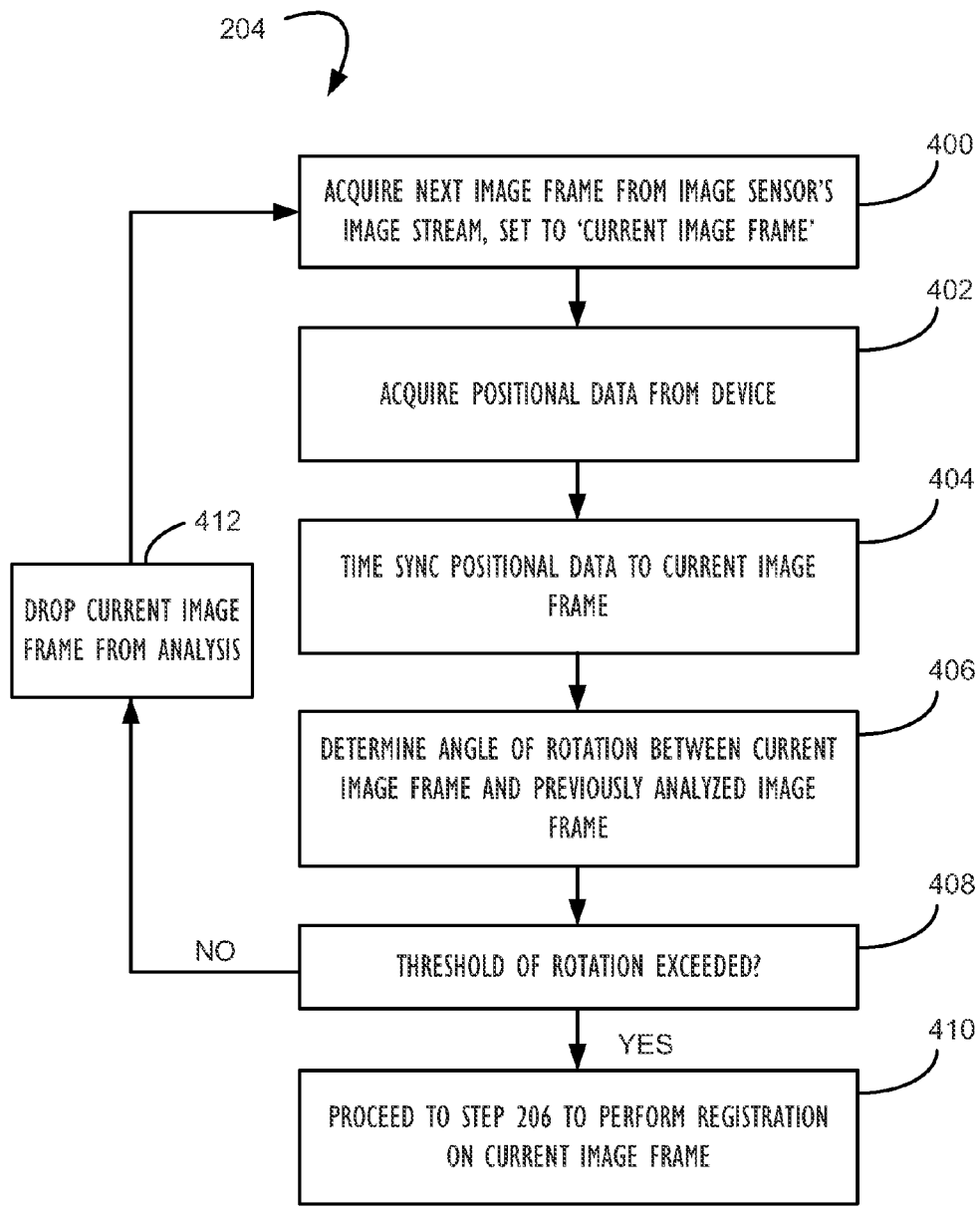
FIG. 4 illustrates a process for performing positional sensor-assisted motion filtering for panoramic photography, in accordance with one embodiment.

Referring now to FIG. 4, a process 204 for performing positional sensor-assisted motion filtering for panoramic photography is shown in flow chart form, in accordance with one embodiment. FIG. 4 provides greater detail to Motion Filtering Step 204, which was described above in reference to FIG. 2. First, an image frame is acquired from an image sensor of an electronic device, e.g., a handheld personal electronic device, and is designated the "current image frame" for the purposes of motion filtering (Step 400). Next, positional data is acquired, e.g., using the device's gyrometer or accelerometer (Step 102). At this point, if it has not already been done, the process 204 may need to correlate the positional data acquired from the accelerometer and/or gyrometer in time with the acquired image frame. Because the camera device's image sensor and positional sensors may have different sampling rates and/or have different data processing rates, it may be important to know precisely which image frame(s) a given set of positional sensor data is linked to. In one embodiment, the process 204 may use as a reference point a first system interrupt to sync the image data with the positional data, and then rely on knowledge of sampling rates of the various sensors going forward to keep image data in proper time sync with the positional data. In another embodiment, periodic system interrupts may be used to update or maintain the synchronization information.

Next, the motion filtering process 204 may determine an angle of rotation between the current image frame and previously analyzed image frame (ft there is one) using the positional sensor data (as well as feedback from an image registration process, as will be discussed in further detail below) (Step 406). For example, the motion filtering process 204 (e.g., as performed by motion filter module 142) may calculate an angle of rotation by integrating over the rotation angles of an interval of previously captured image frames and calculating a mean angle of rotation for the current image frame. In some embodiments, a "look up table" (LUT) may be consulted. In such embodiments, the LUT may possess entries for various rotation amounts, which rotation amounts are linked therein to a number of images that may be filtered out from the assembly of the resultant panoramic image. If the angle of rotation for the current image frame has exceeded a threshold of rotation (Step 408), then the process 204 may proceed to Step 206 of the process flow chart illustrated in FIG. 2 to perform image registration (Step 410). If instead, at Step 408, it is determined that a threshold amount of rotation has not been exceeded for the current image frame, then the current image frame may be discarded (Step 412), and the process 204 may return to Step 400 to acquire the next captured image frame, at which point the process 204 may repeat the motion filtering analysis to determine whether the next frame is worth keeping for the resultant panoramic photograph. In other words, with motion filtering, the image frames discarded are not just every third frame or every fifth frame; rather, the image frames to be discarded are determined by the motion filtering module calculating what image frames will likely provide full coverage for the resultant assembled panoramic image. In one embodiment, the equation to turn the rotation angle (in degrees) into an approximate image center position change (i.e., translation amount) is as follows: translation=f*sin(3.1415926*angle/180), where f is the focal length. Strictly speaking, since rotation introduces perspective change, each pixel in the image has a different position change, but the above equation gives good estimates when relatively narrow constituent images are used to construct the panoramic image.

Turning now to FIG. 5A, an exemplary panoramic scene 300 is shown as captured by an electronic device 308 panning across the scene with constant velocity, according to one embodiment. FIG. 5A illustrates exemplary decisions that may be made by the motion filter module 142 during a constant-velocity panoramic sweep across a panoramic scene. As shown in FIG. 5A, the panoramic sweep begins at device position $308_{START}$ and ends at position $308_{STOP}$. The dashed line parallel to axis 306 representing the path of the panoramic sweep of device 308 is labeled with "(dx/dt>0, $d^2x/dt^2$=0)" to indicate that, while the device is moving with some velocity, its velocity is not changing during the panoramic sweep.

In the exemplary embodiment of FIG. 5A, device 308 is capturing a video image stream 500 at a frame rate, e.g., 30 frames per second. As such, and for the sake of example, a sweep lasting 2.5 seconds would capture 75 image frames 502, as is shown in FIG. 5A. Image frames 502 are labeled with subscripts ranging from $502_1$-$502_{75}$ to indicate the order in which they were captured during the panoramic sweep of panoramic scene 300. As may be seen from the multitude of captured image frames 502, only a distinct subset of the image frames will be needed by the post-processing software to assemble the resultant panoramic photograph. By intelligently eliminating the redundant data, the panoramic photography process 200 may run more smoothly on device 308, even allowing device 308 to provide previews and assemble the resultant panoramic photograph in real time as the panoramic scene is being captured.

The frequency with which captured image frames may be selected for inclusion in the assembly of the resultant panoramic photograph may be dependent on any number of factors, including: device 308's field of view 302; the distance between the camera device 308 and the panoramic scene 300 being captured; as well as the speed and/or acceleration with which the camera device 308 is panned. In the exemplary embodiment of FIG. 5A, the motion filtering module has determined that image frames $502_2$, $502_{20}$, $502_{38}$, $502_{56}$, and $502_{74}$ are needed for inclusion in the construction of the resultant panoramic photograph. In other words, roughly every $18^{th}$ captured image frame will be included in the construction of the resultant panoramic photograph in the example of FIG. 5A. As will be seen below in reference to FIG. 5B, the number of image frames captured between image frames selected by the motion filter module for inclusion may be greater or smaller than 18, and may indeed change throughout and during the panoramic sweep based on, e.g., the velocity of the camera device 308 during the sweep, acceleration or deceleration during the sweep, and rotation of the camera device 308 during the panoramic sweep.

As shown in FIG. 5A, there is roughly 25% overlap between adjacent selected image frames. In some embodiments, more overlap between selected adjacent image frames will be desired, depending on memory and processing constraints of the camera device and post-processing software being used. As will be described in greater detail below with reference to FIG. 6, with large enough frames per second capture rates, even greater efficiencies may be achieved in the panoramic photograph process 200 by analyzing only a "slit" or "slice" of each captured image frame rather than the entire captured image frame.

Figure 5B:
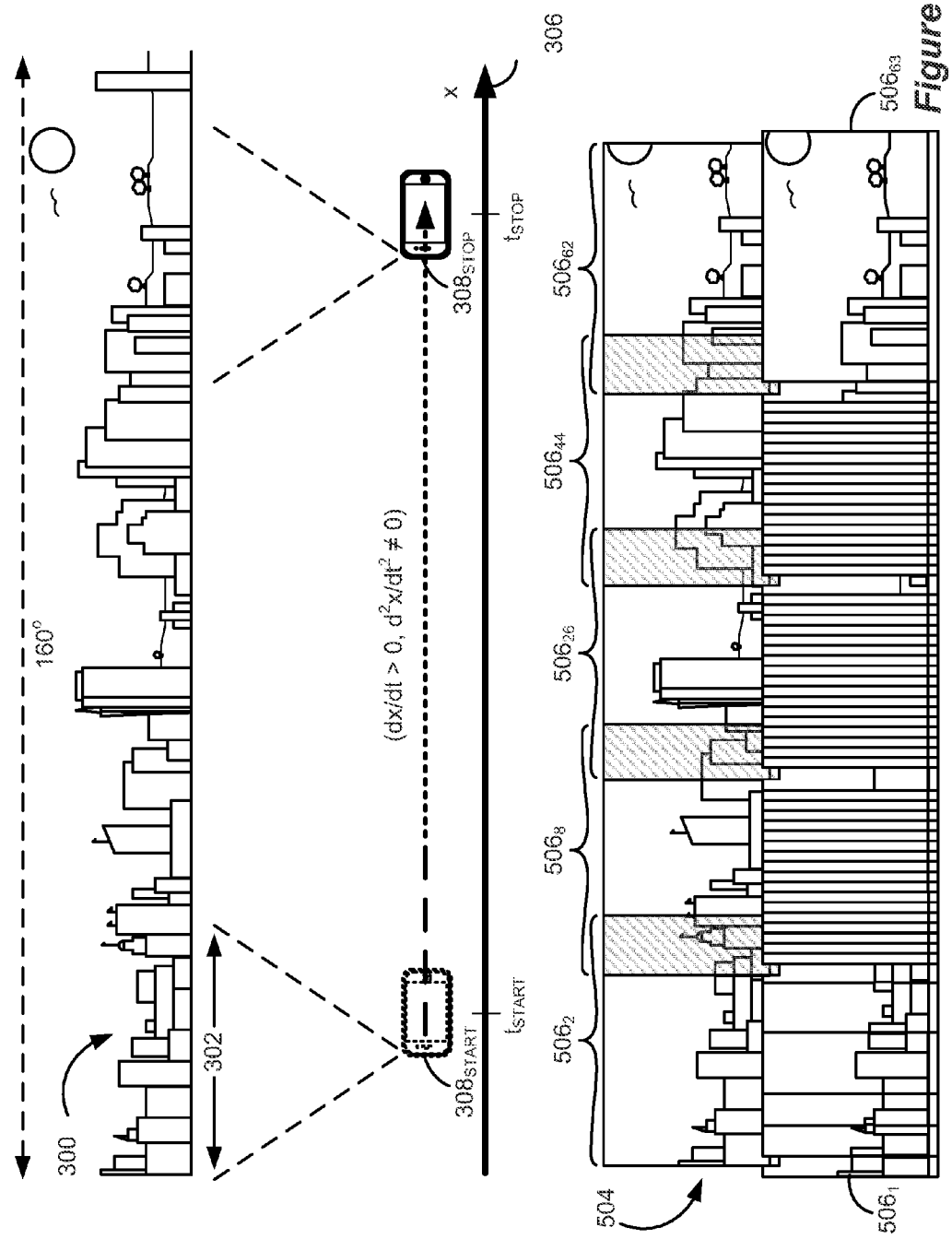
FIG. 5B illustrates an exemplary panoramic scene as captured by an electronic device panning across the scene with non-constant velocity, in accordance with one embodiment.

Turning now to FIG. 5B, an exemplary panoramic scene 300 is shown as captured by an electronic device 308 panning across the scene with non-constant velocity, according to one embodiment. FIG. 5B illustrates exemplary decisions that may be made by the motion filter module during a non-constant-velocity panoramic sweep across a panoramic scene. As shown in FIG. 5B, the panoramic sweep begins at device position $308_{START}$ and ends at position $308_{STOP}$. The dashed line parallel to axis 306 representing the path of the panoramic sweep of device 308 is labeled with "(dx/dt>0, $d^2x/dt^2 \neq 0$)" to indicate that, the device is moving with some non-zero velocity and its velocity changes along the panoramic path.

In the exemplary embodiment of FIG. 5B, device 308 is capturing a video image stream 504 at a frame rate, e.g., 30 frames per second. As such, and for the sake of example, a sweep lasting 2.1 seconds would capture 63 image frames 506, as is shown in FIG. 5B. Image frames 506 are labeled with subscripts ranging from $506_1$-$506_{63}$ to indicate the order in which they were captured during the panoramic sweep of panoramic scene 300.

In the exemplary embodiment of FIG. 5B, the motion filtering module has determined that image frames $506_2$, $506_8$, $506_{26}$, $506_{44}$, and $506_{62}$ are needed for inclusion in the construction of the resultant panoramic photograph. In other words, the number of image frames captured between image frames selected by the motion filter module may change throughout and during the panoramic sweep based on, e.g., the velocity of the camera device 308 during the sweep, acceleration or deceleration during the sweep, and rotation of the camera device 308 during the panoramic sweep.

As shown in FIG. 5B, movement of device 308 is faster during the first quarter of the panoramic sweep (compare the larger dashes in the dashed line at the beginning of the panoramic sweep to the smaller dashes in the dashed line at the end of the panoramic sweep). As such, the motion filter module has determined that, after selection image frame $506_2$, by the time the camera device 308 has captured just six subsequent image frames, there has been sufficient movement of the camera across the panoramic scene 300 (due to the camera device's rotation, translation, or a combination of each) that image frame $506_8$ must be selected for inclusion in the resultant panoramic photograph. Subsequent to the capture of image frame $506_8$, the movement of camera device 308 during the panoramic sweep has slowed down to a level more akin to the pace of the panoramic sweep described above in reference to FIG. 5A. As such, the motion filter module may determine again that capturing every $18^{th}$ frame will provide sufficient coverage of the panoramic scene. Thus, image frames $506_{26}$, $506_{44}$, and $506_{62}$ are selected for inclusion in the construction of the resultant panoramic photograph. By reacting to the motion of the camera device 308 in real time, the panoramic photography process 200 may intelligently and efficiently select image data to send to the more computationally-expensive registration and stitching portions of the panoramic photography process. In other words, the rate at which the act of motion filtering occurs may be directly related to the rate at which the device is being accelerated and/or rotated during image capture.

As mentioned above, modern image sensors are capable of capturing fairly large images, e.g., eight megapixel images, at a fairly high capture rate, e.g., thirty frames per second. Given the panning speed of the average panoramic photograph, these image sensors are capable of producing—though not necessarily processing—a very large amount of data in a very short amount of time. Much of this produced image data has a great deal of overlap between successively captured image frames. Thus, the inventors have realized that, by operating on only a portion of each selected image frame, e.g., a "slit" or "slice" of the image frame, greater efficiencies may be achieved. In a preferred embodiment, the sift may comprise the central one-eighth portion of each image frame. In other embodiments, other portions of the image may be used for the "slit" or "slice," e.g., one-third, one-fourth, or one-fifth of the image may be used.

Figure 6:
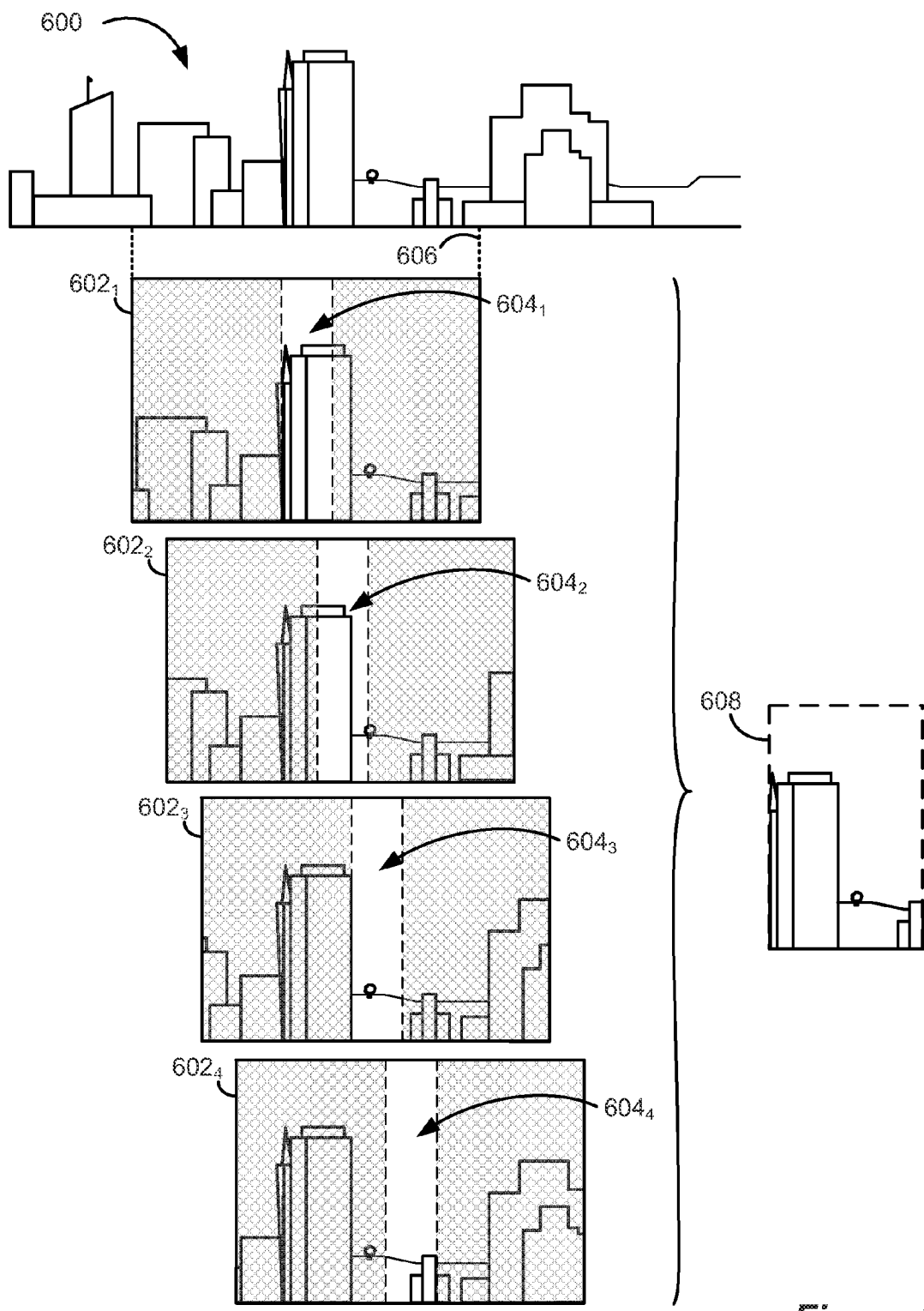
FIG. 6 illustrates image "slits" or "slices," in accordance with one embodiment.

Turning now to FIG. 6, image "slits" or "slices" 604 are shown, in accordance with one embodiment. In FIG. 6, panoramic scene 600 has been captured via a sequence of selected image frames labeled $602_1$-$602_4$. As discussed above with reference to motion filtering, the selected image frames labeled $602_1$-$602_4$ may represent the image frames needed to achieve full coverage of panoramic scene 600. Trace lines 606 indicate the portion of the panoramic scene 600 corresponding to the first captured image frame $602_1$. The central portion 604 of each captured image frame 602 represents the selected image slit or slice that may be used in the construction of the resultant panoramic photograph. As shown in FIG. 6, the image slits comprise approximately the central 12.5% of the image frame. The diagonally shaded areas of the images frames 602 may likewise be discarded as overly redundant of other captured image data. According to one embodiment described herein, each of selected image slits labeled $604_1$-$604_4$ may subsequently be aligned, stitched together, and blended in their overlapping regions, producing resultant panoramic image portion 608. Portion 608 represents the region of the panoramic scene captured in the four image slits $604_1$-$604_4$. Additionally, the inventors have surprisingly discovered that operating on only a portion of each of the image frames selected for additional processing by the motion filter, e.g., a central portion of each selected image frame, some optical artifacts such as barrel or pincushion distortions, lens shading, vignetting, etc. (which are more pronounced closer to the edges of a captured image) may be diminished or eliminated altogether. Further, operating on only portions of each selected image frame creates a smaller instantaneous memory footprint for the panoramic photography process, which may become important when assembling a full-resolution panoramic image.

Figure 7A:
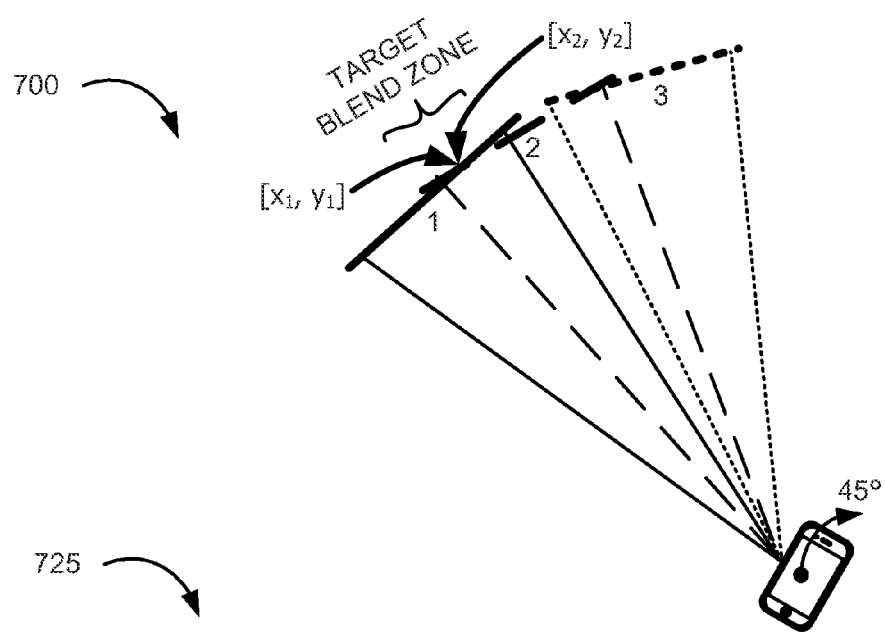
FIG. 7A illustrates an exemplary panoramic sweep with arch, in accordance with one embodiment.

Turning now to FIG. 7A, an exemplary panoramic sweep with arch 700 is shown, in accordance with one embodiment. In FIG. 7A, the camera device is rotated through a 45 degree angle while capturing three distinct images. Solid lines correspond to the field of view of the camera while capturing image 1, with the thick solid line representing the plane of image 1; dashed lines correspond to the field of view of the camera while capturing image 2, with the thick dashed line representing the plane of image 2; and dotted lines correspond to the field of view of the camera while capturing image 3, with the thick dotted line representing the plane of image 3. The area labeled "TARGET BLEND ZONE" represents the overlapping region between images 1 and 2. There would be a corresponding target blend zone between images 2 and 3, though it is not labeled for simplicity. In the case of a rotating panoramic sweep where the camera is not also moving in space, the size of the target blend zone may be heavily dependent on the amount of angular rotation of the camera between successively captured image frames. As mentioned above, in one preferred embodiment, the amount of overlap between successively captured images is approximately 25%, but may be greater or lesser, depending on the image registration algorithm used.

Also labeled on FIG. 7A are points $[x_1, y_1]$ and $[x_2, y_2]$. These sets of points correspond to an exemplary feature or edge or other detectable portion located in both image 1 and image 2. By locating the same feature, edge, or otherwise portion of image 1 in image 2, and then recording the difference between its location in image 2 and image 1, a value referred to herein as a $[t_x, t_y]$ value may be calculated for image 2. In one embodiment, the $[t_x, t_y]$ value for a given point in image 2 may be calculated according to the following equation: $[(x_2-x_1), (y_2-y_1)]$. Using $[t_x, t_y]$ values, the panoramic photography process 200 may then be able to better align, i.e., perform image registration between, the two images in question. In addition to aiding in image registration, the use of the $[t_x, t_y]$ values may be correlated to the positional information obtained from the device's positional sensors. In other words, the image registration process 206 may be able to refine the calculations being made by the motion filter module relating to how much movement in the device corresponds to how much actual movement in the captured image. For example, if the motion filter module was operating under the assumption that 1 degree of rotation corresponds to 10 pixels of movement in a subsequently captured image, but the image registration process 206 determined that, for a 10 degree rotation between successively captured images, a particular feature moved 150 pixels, the motion filter module may adjust its assumptions upwardly, whereby 1 degree of camera rotation is henceforth correlated to an assumed 15 pixels of movement in a subsequently captured image rather than only 10 pixels of movement. This feedback of information from the image registration process 206 to the motion filter module is also represented in FIG. 2 via the dashed line arrow pointing from Step 206 to Step 204 labeled "FEEDBACK."

Figure 7B:
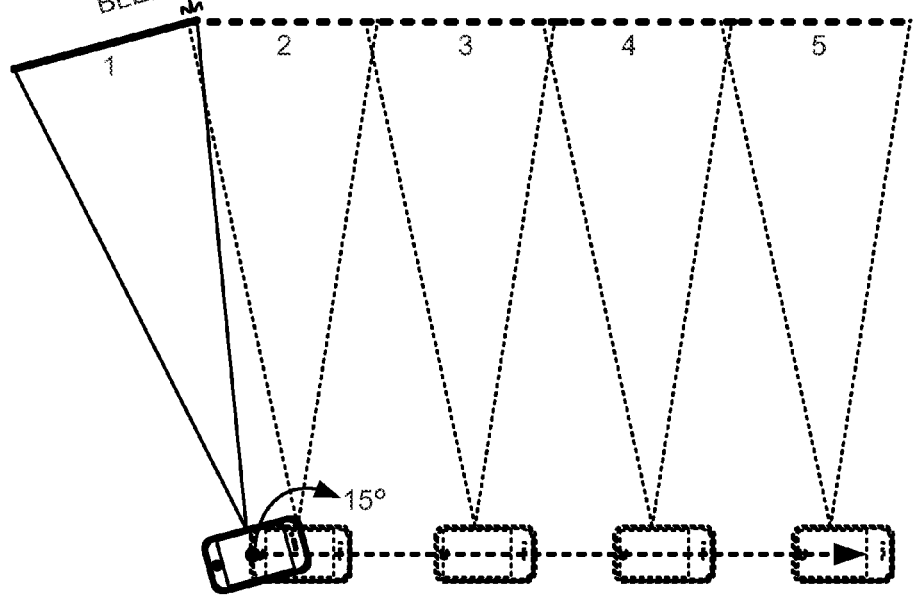
FIG. 7B illustrates an exemplary near-linear panoramic sweep, in accordance with one embodiment.

Turning now to FIG. 7B, an exemplary near-linear panoramic sweep 725 is shown, in accordance with one embodiment. In FIG. 7B, the camera device is rotated through a 15 degree angle early in the panoramic sweep, and then translated in position without further rotation while capturing five distinct images. Solid lines correspond to the field of view of the camera while capturing image 1, with the thick solid line representing the plane of image 1; dashed lines correspond to the field of view of the camera while capturing images 2 through 5, with the thick dashed line representing the planes of images 2 through 5, respectively. The area labeled "TARGET BLEND ZONE" represents the overlapping region between images 1 and 2. There would be a corresponding target blend zone between images 2 and 3, and each other pair of successively captured images, although they are not labeled for simplicity. In the case of a near-linear panoramic sweep, the size of the target blend zone may be heavily dependent on the speed at which the camera is moved between successively captured image frames. With a near-linear panoramic sweep, more images may potentially be needed since the field of view of the camera may be changing more rapidly than during a mere rotational sweep, however, as long as sufficient overlap remains between successively captured image frames, the panoramic process 200 can produce a resultant image.

Figure 7C:
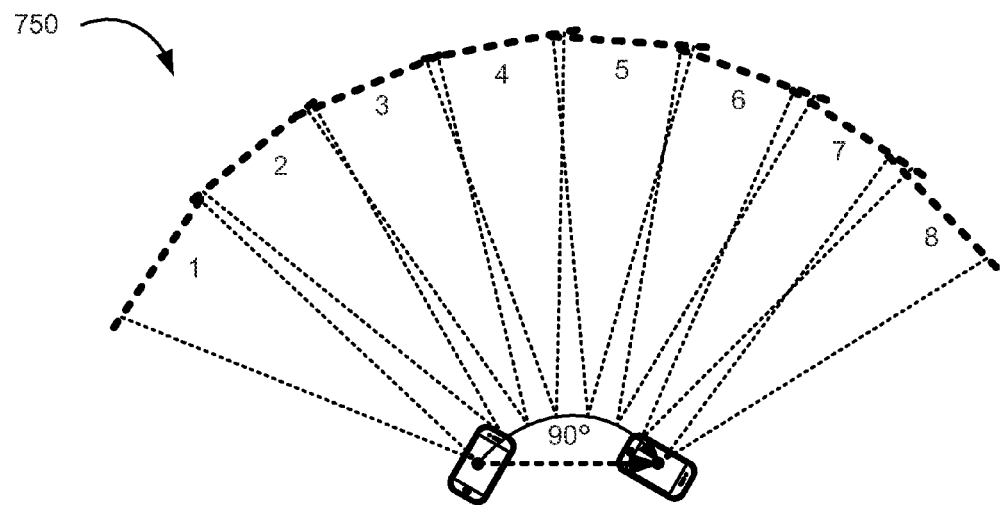
FIG. 7C illustrates an exemplary "short arm" panoramic sweep, in accordance with one embodiment.
Figure 7D:
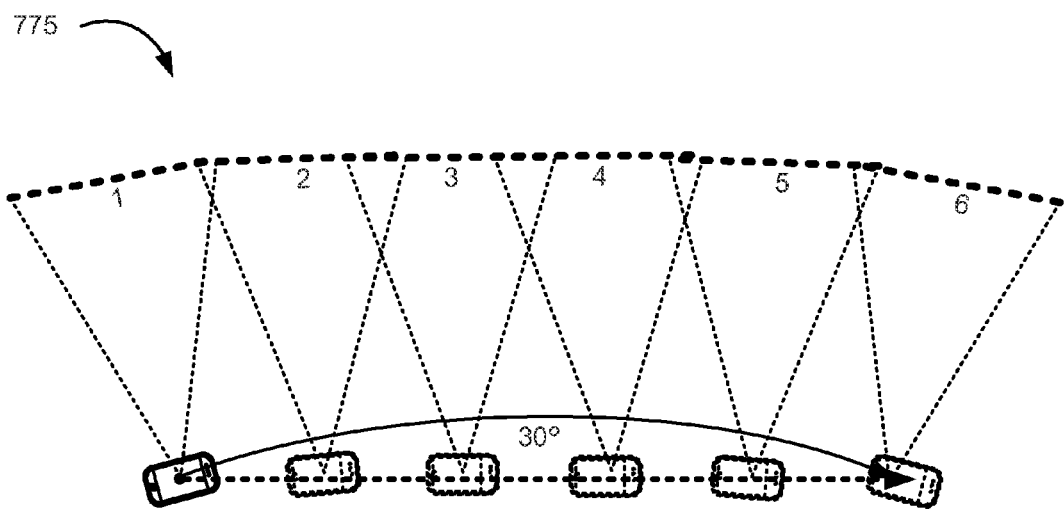
FIG. 7D illustrates an exemplary "long arm" panoramic sweep, in accordance with one embodiment.

Other types of panoramic sweeps are also possible, of course. For example, FIG. 7C shows a "short arm" panoramic sweep 750, i.e., a panoramic sweep having relatively more rotation and less displacement. FIG. 7D, on the other hand, shows an example of a "long arm" panoramic sweep 775, a panoramic sweep having more displacement per degree of rotation than the "short arm" panoramic sweep. By being able to distinguish between the infinitely many types of panoramic sweeps possible via the use of positional sensors within the camera device, the motion filtering module may make the appropriate adjustments to the panoramic photography process so that visually pleasing panoramic photographic results are still generated in an efficient manner.

Figure 8:
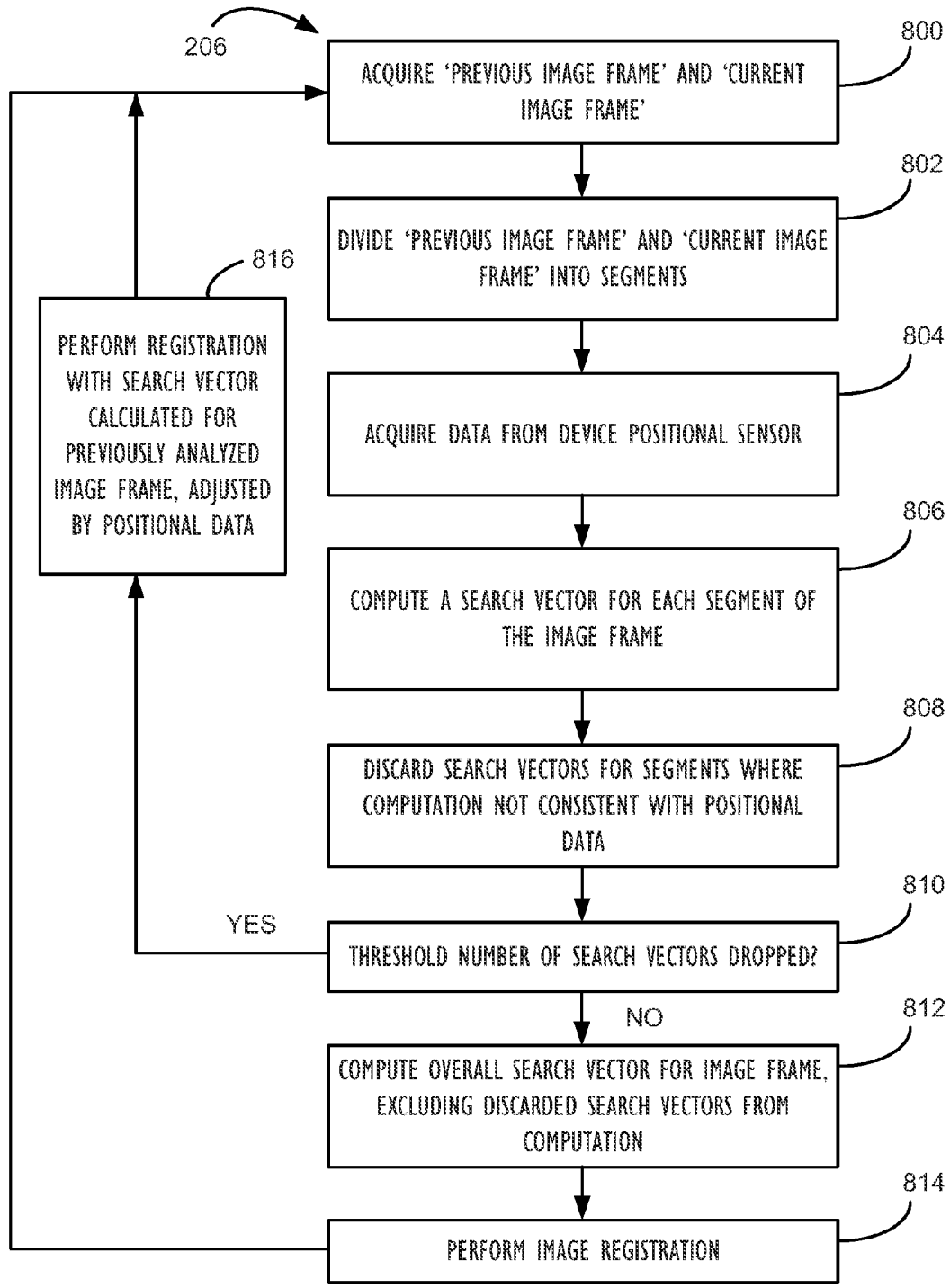
FIG. 8 illustrates a process for performing image registration for panoramic photography, in accordance with one embodiment.

Turning now to FIG. 8, a process 206 for performing image registration for panoramic photography is shown in flow chart form, in accordance with one embodiment. FIG. 8 provides greater detail to Image Registration Step 206, which was described above in reference to FIG. 2. First, the process 206 may acquire the two images that are to be registered (Step 800). Next, each image may be divided into a plurality of segments (Step 802). An image segment may be defined as a portion of an mage of predetermined size. In addition to the image information, the process 206 may acquire metadata information, e.g., the positional information corresponding to the image frames to be registered (Step 804). Through the use of an image registration algorithm involving, e.g., a feature detection algorithm (such as a "FAST," Harris, SIFT, or a Kanade-Lucas-Tomasi (KLT) feature tracker algorithm) or a cross-correlation algorithm (i.e., a method of cross-correlating intensity patterns in a first image with intensity patterns in a second image via correlation metrics), a search vector may be calculated for each segment of the image. A segment search vector may be defined as a vector representative of the transformation that would need to be applied to the segment from the first image to give it its location in the second image. Once search vectors have been calculated, the process 206 may consider the positional information acquired from the device's positional sensors and drop any search vectors for segments where the computed search vector is not consistent with the acquired positional data (Step 808). That is, the process 206 may discard any search vectors that are opposed to or substantially opposed to a direction of movement indicated by the positional information. For example, if the positional information indicates the camera has been rotated to the right between successive image frames, and an object in the image moves to the right (i.e., opposed to the direction that would be expected given the camera movement) or even stays stationary from one captured image to the next, the process 206 may determine that the particular segments represent outliers or an otherwise unhelpful search vector. Segment search vectors that are opposed to the expected motion given the positional sensor information may then be dropped from the overall image registration calculation (Step 808).

In the case of using a cross-correlation algorithm for image registration, the direct difference between a given pixel, Pixel A, in a first image, Image A, and the corresponding pixel, Pixel A', in a second image, Image B, is evaluated. Then the difference between Pixels B and B' are taken in the same way and so forth, until all the desired pixels have been evaluated. At that point, all of the differences are summed together. Next, the cross-correlation process slides over by one pixel, taking the direct difference between Pixel A and B', B and C' and so forth, until all the desired pixels have been evaluated. At that point, all of the differences are summed together for the new "slid over by one pixel" position. The cross-correlation may repeat this process, sliding the evaluation process by one pixel in all relevant directions until a minimum of all sums is found, which indicates that the images match when the first image is moved in the direction resulting in the minimum sum. For a given pair of images to be registered, rather than querying in each possible direction to determine the direction of minimum difference, the number of directions queried may be limited to only those that make sense given the cues from the device's positional sensors. By limiting the number of inquiries at each level of a cross-correlation algorithm, the registration process 206 may potentially be sped up significantly. If more than a threshold number of the segments have been dropped for any one image (Step 810), the process 206 may perform registration using a translation vector calculated for a previously analyzed image frame, making necessary adjustments that are suggested by positional information received from the accelerometer and/or pyrometer for the current image frame (Step 816). In some embodiments, the threshold number of segments may be approximately 50% of all the segments that the image has been divided into. The process 206 may then return to Step 800 and await the next pair of images to register. If instead, at Step 810, more than a threshold number of the segments have not been dropped for the image, the process 206 may then compute an overall translation vector for the image with the remaining vectors that were not discarded based on cues taken from the positional information (Step 812) and register the newly acquired image (Step 814) before returning to Step 800 to await the next pair of images to register.

One special case where movement of image segments may oppose the motion expected given the positional information cues is that of a reflection moving in a mirror. In these cases, if the image registration process 206 described above in reference to FIG. 8 indicates that most or all of the vectors are outliers/unexpected given the camera's movement, the process 206 may continue with a so-called "dead reckoning" process, that is, using the previously calculated translation vector, and then modifying it by taking into account any cues that may be available from, for example, accelerometer or gyrometer data.

Figure 9:
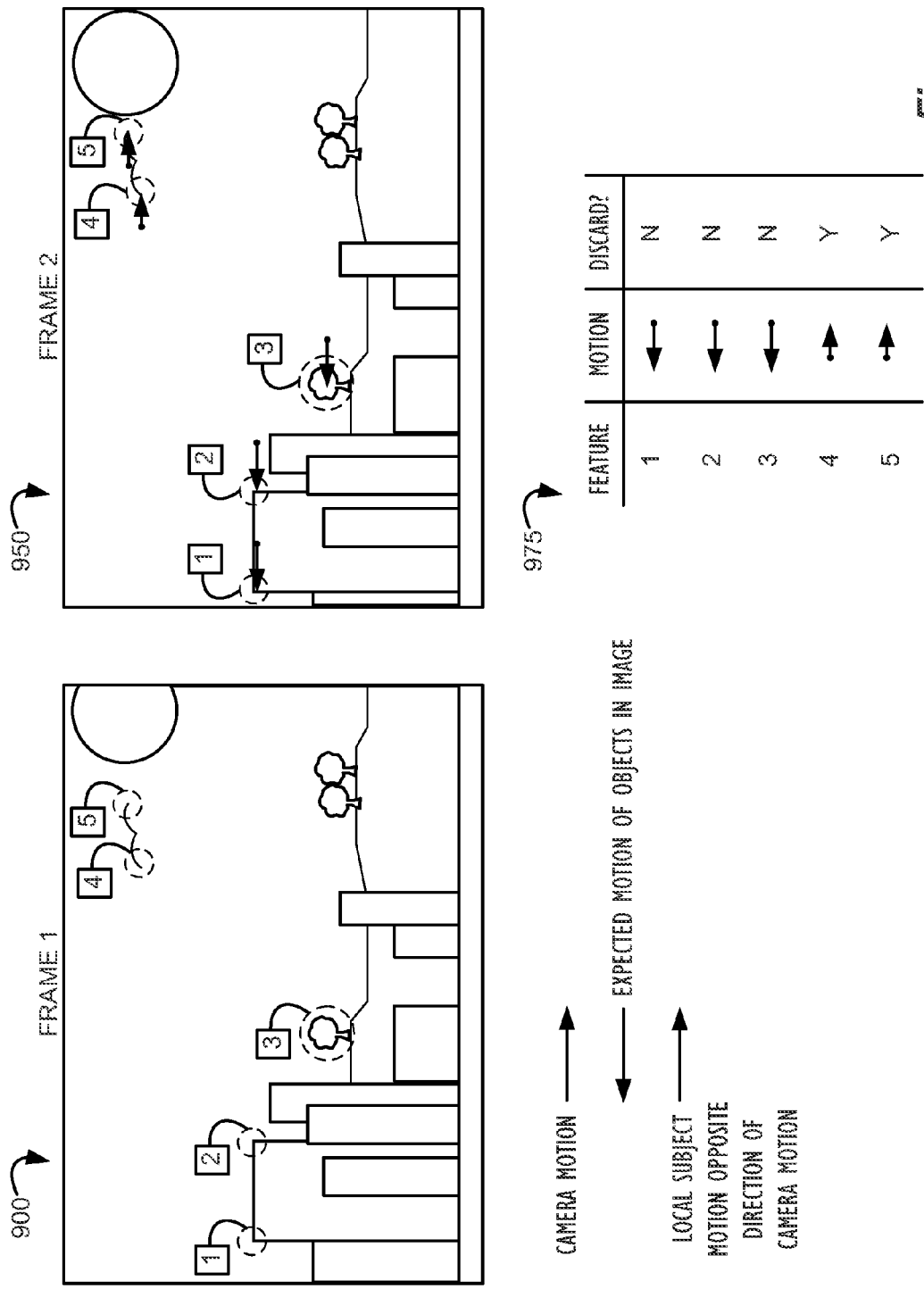
FIG. 9 illustrates positional information-assisted feature detection, according to one embodiment.

Turning now to FIG. 9, positional information-assisted feature detection is illustrated, according to one embodiment. In FIG. 9, a first frame 900 is illustrated and labeled "FRAME 1" and a second frame 950 is illustrated and labeled "FRAME 2." FRAME 1 represents an image captured immediately before, or nearly immediately before FRAME 2 during a camera pan. Below FRAME 1, the motion of the camera is indicated as being to the right during the camera pan. As such, the expected motion of stationary objects in the image will be to the left with respect to a viewer of the image. Thus, local subject motion opposite the direction of the camera's motion will be to the right (or even appear stationary if the object is moving at approximately the same relative speed as the camera). Of course, local subject motion may be in any number of directions, at any speed, and located throughout the image. The important observation to make is that local subject motion that is not in accordance with the majority of the calculated search vectors for a given image would actually hinder image registration calculations rather than aid them.

Turning to table 975, search vectors for five exemplary features located in FRAME 1 and FRAME 2 are examined in greater detail. Features 1 and 2 correspond to the edges or corners of one of the buildings in the panoramic scene. As is shown in FRAME 2, these two features have moved in leftward direction between the frames. This is expected movement, given the motion of the camera direction to the right (as evidenced by the camera's positional sensors). Feature 3 likewise represents a stationary feature, e.g., a tree, that has moved in the expected direction between frames, given the direction of the camera's motion. Features 4 and 5 correspond to the edges near the wingtips of a bird. As the panoramic scene was being captured, the bird may have been flying in the direction of the camera's motion, thus, the search vectors calculated for Features 4 and 5 are directed to the right, and opposed to the direction of Features 1, 2, and 3. This type of local subject motion may worsen the image registration determination since it does not actually evidence the overall translation vector from FRAME 1 to FRAME 2. As such, and using cues received from the positional sensors in the device capturing the panoramic scene, such features (or, more accurately, the regions of image data surrounding such features) may be discarded from the image registration determination.

Figure 10:
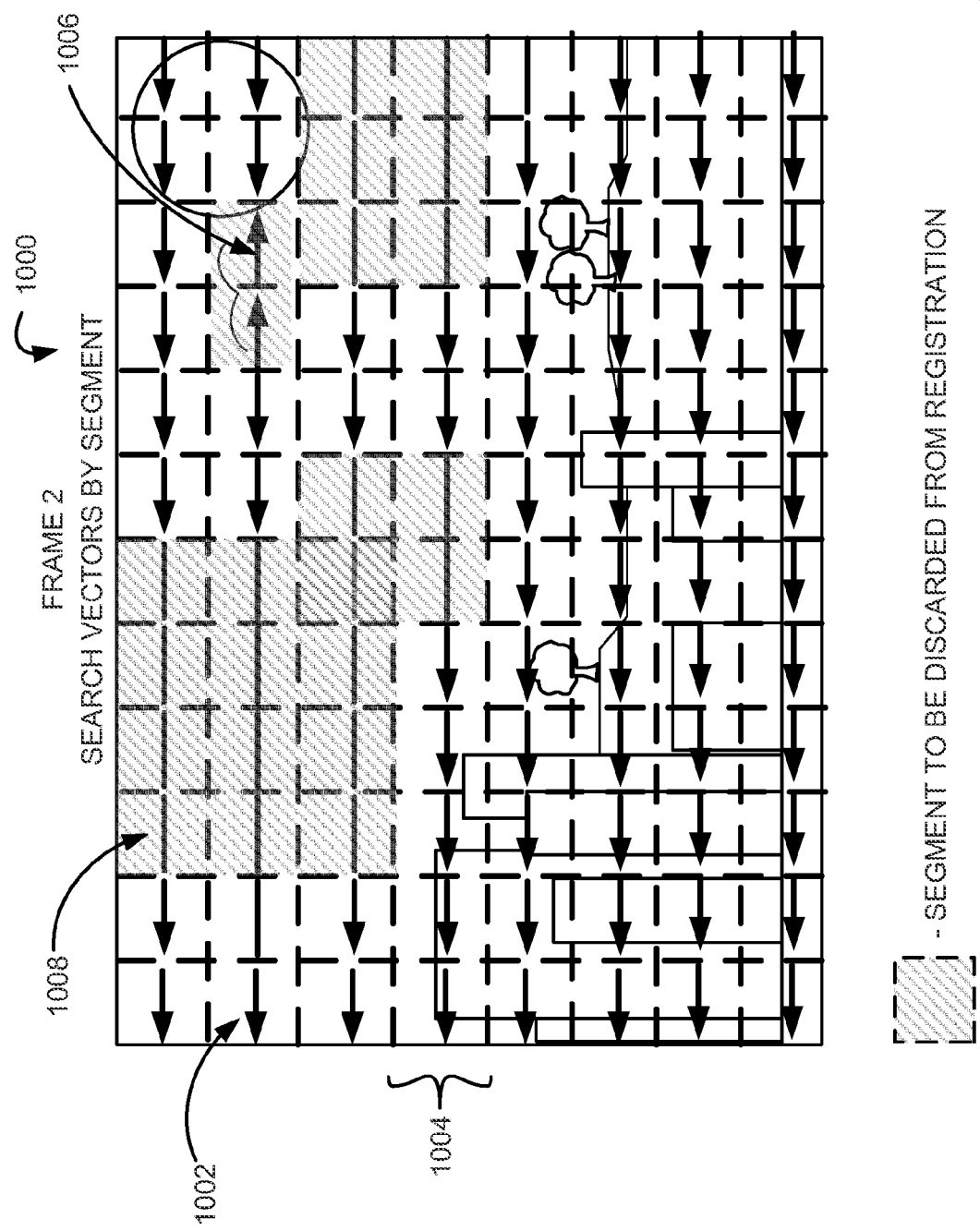
FIG. 10 illustrates search vector segments for a given image frame, according to one embodiment.

Turning now to FIG. 10, search vector segments 1004 for a given image frame 1000 are shown, in accordance with one embodiment. As mentioned above, each image frame may be divided into a plurality of component segments for the calculation of localized search vectors. Each dashed line block 1004 in image frame 1000 represents a search vector segment. As is shown in image frame 1000, some search vectors, e.g., 1002, are broadly in the expected direction of movement. In the hypothetical example of image frame 1000, the expected motion direction is to the left, given the positional sensor information acquired from the device. Other search vectors, e.g., 1006, are opposed to the expected direction of movement. Still other segments, e.g., 1008, may exist where the image registration process 206 is not able to calculate a search vector due to, e.g., a lack of discernable features or a random repeating pattern that cannot be successfully cross-correlated or feature matched from frame to frame. Examples of subject matter where this may occur are a cloudless blue sky or the sand on a beach. As explained in the legend of FIG. 10, search vector segments with diagonal shading may be dropped from the image registration calculation. As shown in image frame 1000, the search vector segments dropped from the calculation comprise those segments that are opposed to or substantially opposed to a direction of movement indicated by the positional information received from the device and/or those segments where no direction can be determined. By strategically eliminating large portions of the image from the registration calculation, performance improvements may be achieved.

Figure 11:
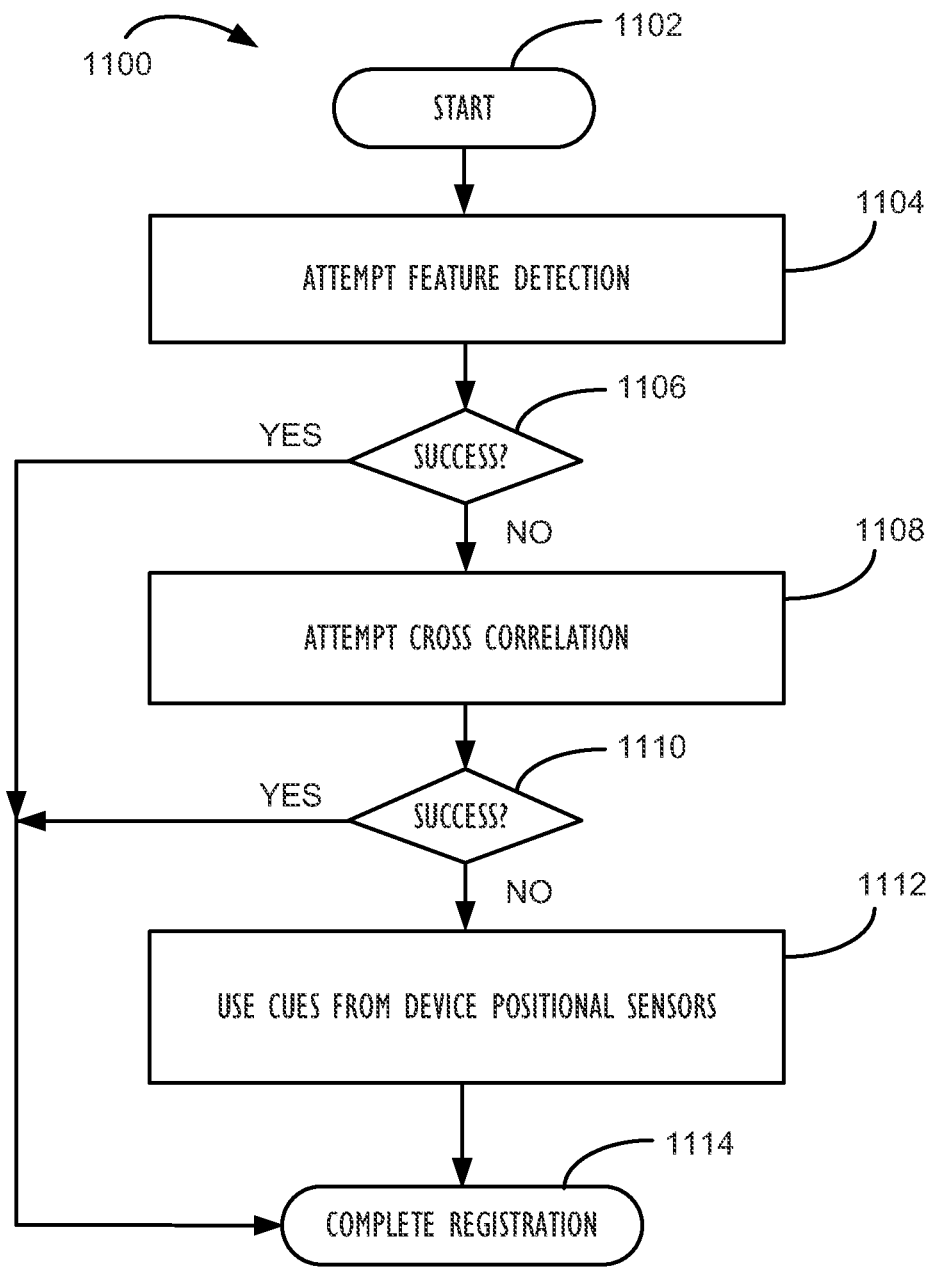
FIG. 11 illustrates a decision flow chart for image registration, in accordance with one embodiment.

Turning now to FIG. 11, a decision flow chart 1100 for image registration is shown, in accordance with one embodiment. First the decision process 1100 begins at Step 1102. At this point, a preferred feature detection algorithm may be executed over the images to be registered (Step 1004). The features detection algorithm may be any desired method, such as the FAST or the KLT feature tracker. If such an algorithm is able to successfully register the images (Step 1106), then registration is completed (Step 1114). If instead, the feature detection method does not produce satisfactory results, a cross-correlation algorithm may be employed (Step 1108).

As mentioned above, a cross-correlation algorithm may attempt to start at a particular pixel in the image and examine successively larger levels of surrounding pixels for the direction of most likely movement between image frames by cross-correlating intensity patterns in the source image with intensity patterns in the target image via correlation metrics. At each increasing level of examination, the direction of search may be informed by the direction of movement calculated at the previous level of examination. For example, at the first level of search, the cross-correlation algorithm may provide the most likely direction for a two-pixel neighborhood ($2^0+1$). Building upon the determination of the first level, the next level may provide the most likely direction for a three-pixel neighborhood ($2^1+1$), and so on and so forth. With image sizes on the order of 5 megapixels (MP), it has been empirically determined that 5 levels of examination, i.e., 17 ($2^4+1$) pixels of movement, provides for sufficient information for the movement between frames being registered.

At each level of the cross-correlation algorithm, the search for most likely direction of movement may be refined by positional information acquired from the device. For instance, rather than querying each of the eight pixels surrounding a central pixel when attempting to perform cross-correlation and determine a direction of most likely movement, the process 1100 may limit its query to those directions that are most likely to be correct, based on positional information acquired from the device. For example, if a device's gyrometer indicates that the device is rotating to the right between successively captured image frames, then the likely translation vectors will be leftward-facing to some degree. Thus, rather than querying all eight pixels in the surrounding neighborhood of pixels for the central pixel, only three pixels need be queried, i.e., the pixel to the upper left, left, and lower left. Such a refinement may provide up to a 62.5% (i.e., ⅝) performance improvement over a traditional cross-correlation algorithm that does not have any a priori guidance regarding likely direction of movement.

As mentioned above, in certain images, both feature detection and cross correlation may be unable to produce satisfactory answers, e.g., images that lack many distinguishing featured or edges, or images with large amounts of noise. Thus, if at Step 1110 cross-correlation also fails to produce satisfactory results, the process 1100 may use the "dead reckoning" approach, i.e., continuing on with the translation vector calculated for the previously registered image, as assisted by any relevant cues from the positional sensor information (Step 1112) in order to complete registration (Step 1114). For example, if the previous image was determined to be a 10 pixel translation to the right, but the accelerometer indicated a sudden stop in the movement of the camera for the current image frame, then the process 1100 may adjust down the 10 pixels to the right translation down to zero pixels of movement, rather than simply carrying forward with the 10 pixels to the right assumption. On the other hand, if both traditional feature detection and cross-correlation methods fail, and the positional information acquired from the device does not indicate any abrupt changes in motion, then continuing to use the 10 pixels to the right assumption may be appropriate until more accurate registration calculations may again be made.

Figure 12:
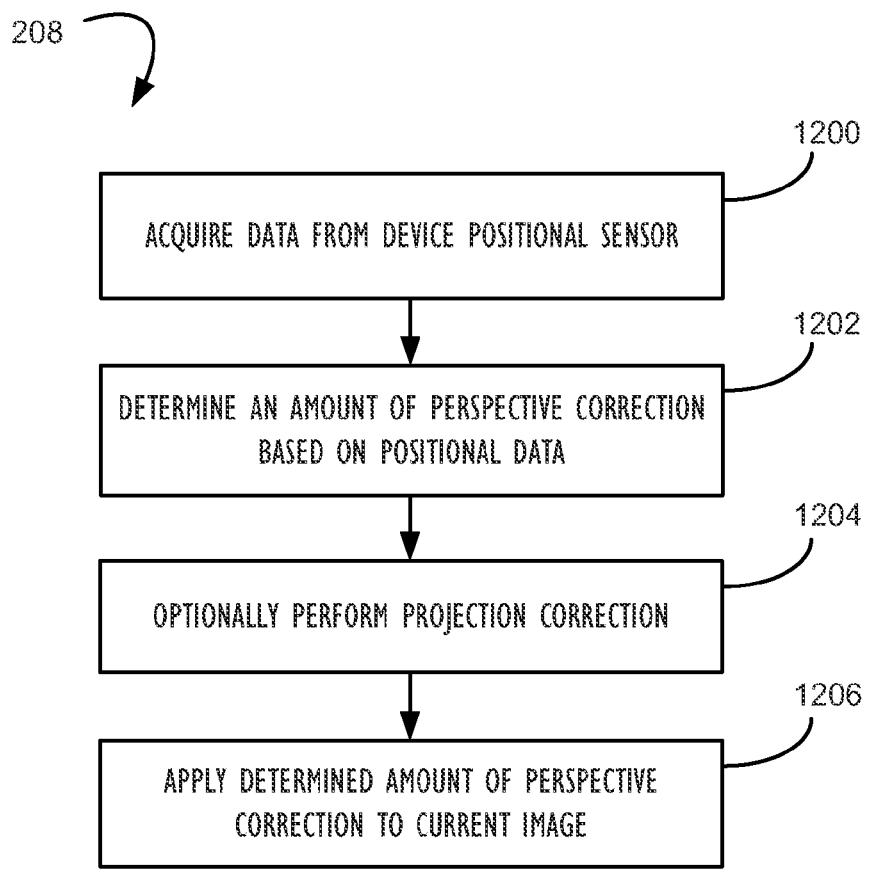
FIG. 12 illustrates a process for performing geometric correction for panoramic photography, in accordance with one embodiment.

Referring now to FIG. 12, a process 208 for performing geometric correction for panoramic photography is shown in flow chart form, in accordance with one embodiment. FIG. 12 provides greater detail to Geometric Correction Step 208, which was described above in reference to FIG. 2. First, the process 208 may acquire the positional data from the device accelerometer and/or gyrometer that has been referred to throughout the panoramic photography process (Step 1200). Next, based on the positional information received from the device, the process 208 may determine an amount of perspective correction that is needed to be applied to the current image frame (Step 1202). For example, a rotation of ten degrees of the camera may correlate to a perspective distortion of 40 pixels, assuming an infinite focus. In some embodiments, a LUT may be consulted. In such an embodiment, the LUT may possess entries for various rotation amounts which rotation amounts are linked therein to an amount of perspective correction. For example, the amount of perspective correction corresponding to a rotation amount in a LUT may be determined at least in part by the resolution of a device's image sensor or a characteristic of a lens of the camera device. Next, an optional image projection correction may be performed, if so desired (Step 1204). However, if the image slits or slices being operated on are sufficiently narrow, the amount of projection correction needed may be quite small, or not needed at all. Finally, the perspective correction may be performed according to a known warping technique, e.g., a cubic interpolation, a bicubic interpolation, a cubic spline, or a bicubic spline (Step 1206). Alternately, perspective change may be inferred from the results of the feature detection process performed in Step 206, though such a route may prove to be more computationally expensive.

Figure 13:
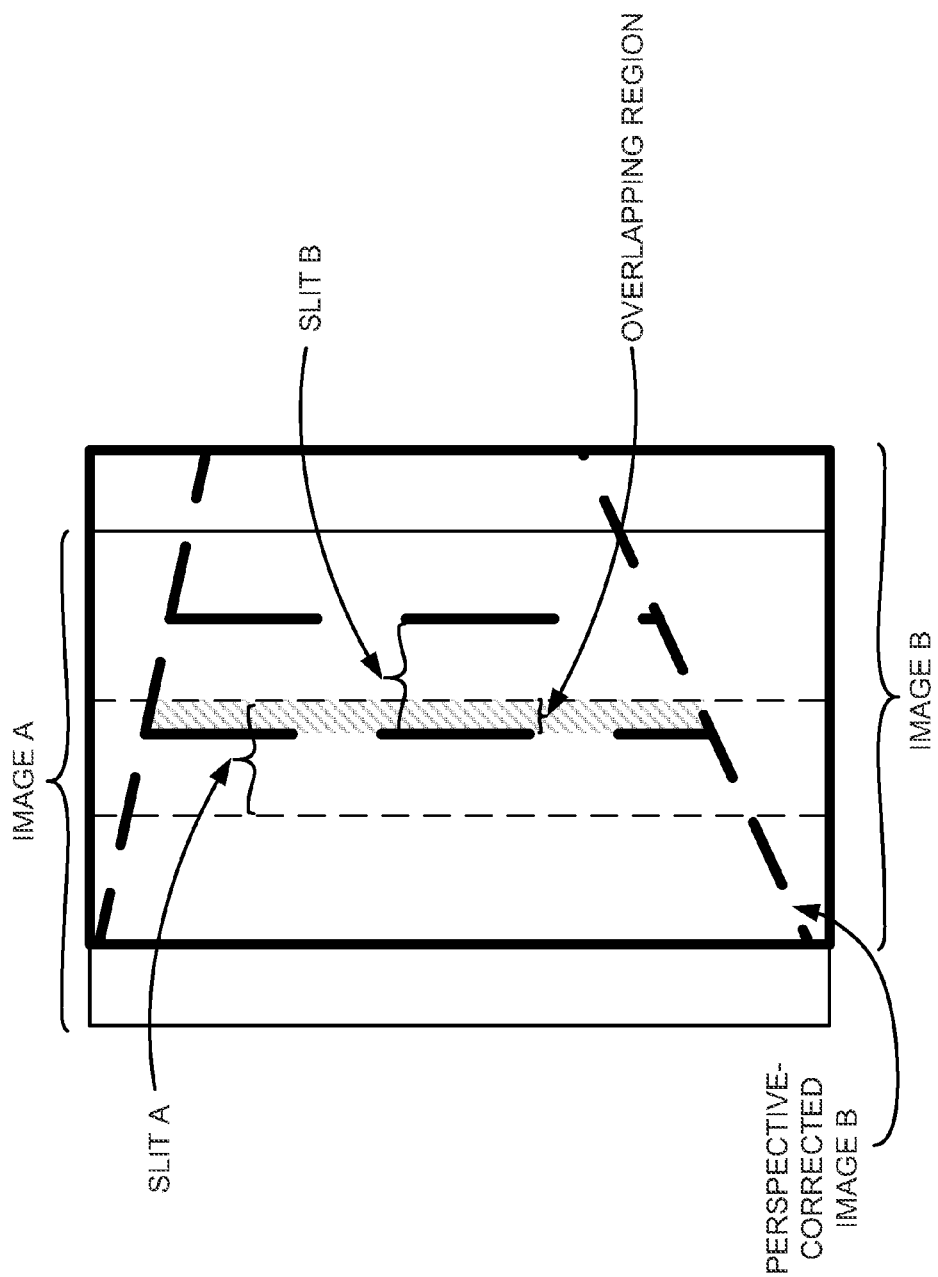
FIG. 13 illustrates perspective change due to camera rotation in the context of image slits or slices, in accordance with one embodiment.

Referring now to FIG. 13, perspective change due to camera rotation is illustrated in the context of image slits or slices, in accordance with one embodiment. As shown in FIG. 13, two images, Image A and Image B have been captured by a camera device. Image A is represented by thin lines, and Image B is represented by thicker lines in FIG. 13. In this example, Image B has been perspective corrected for the rotation of the camera device, i.e., warped, in preparation for blending with Image A, as is shown by the trapezoidal shaped image outline for Image B. Within the central portion of each image lies the image sat, i.e., the portion of each image that will actually be analyzed and contribute towards the creation of the resultant panoramic image. As illustrated, Image Slit A and Image Slit B have an overlapping region labeled "OVERLAPPING REGION" and shaded with diagonal lines, which is the area between Image A and Image B that will be blended to create the resultant panoramic image portion. As illustrated in FIG. 13, due to the relatively narrow dimensions of the image slits being operated on, and the even narrower width of the overlapping region, the amount of perspective correction needed to make Image A and Image B align may be quite small. Further, image projection correction may not be needed due to the narrow nature of the slits being perspective aligned. This is yet another benefit of operating on image slits rather than the entire image frames returned by the camera device.

Figure 14:
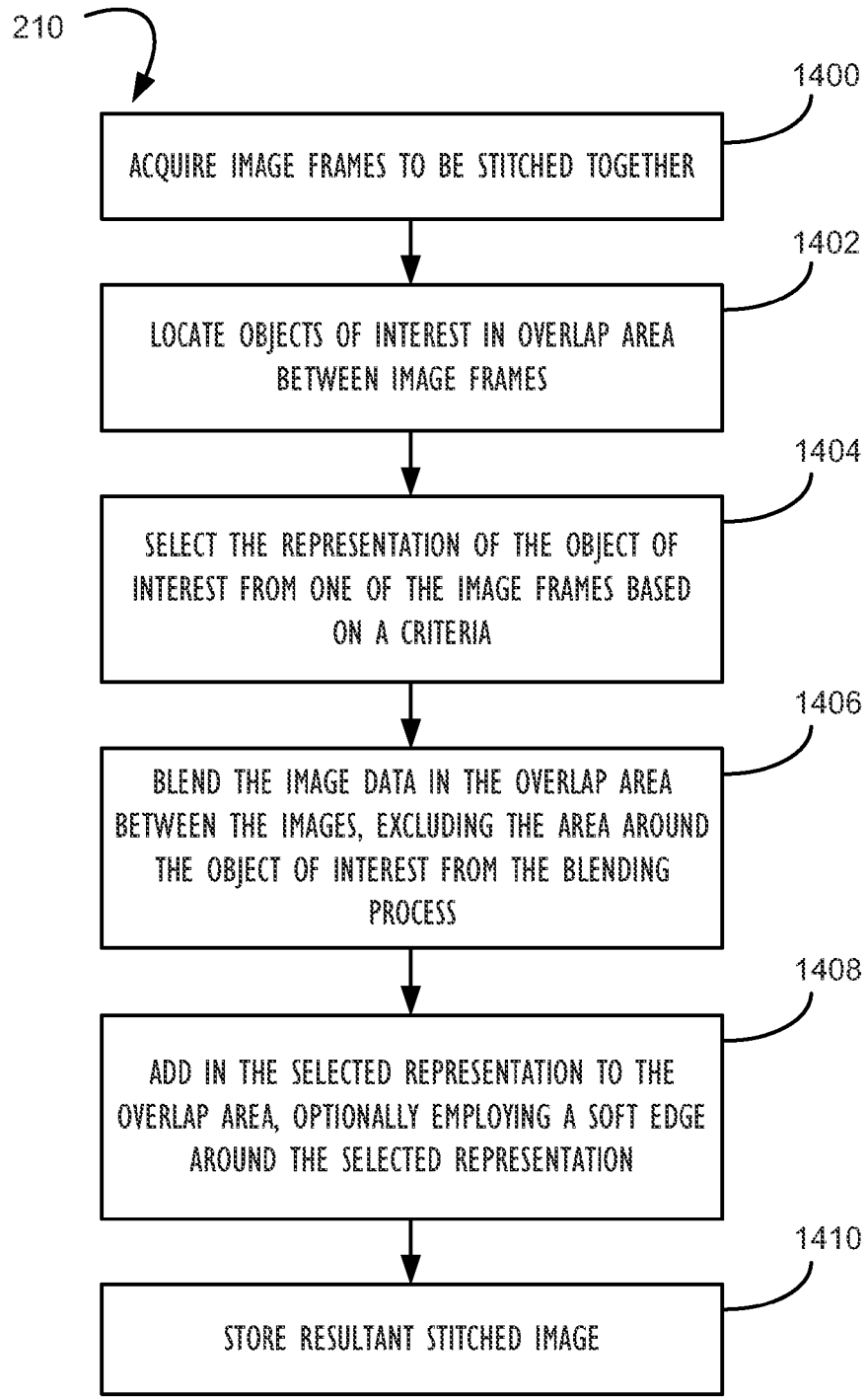
FIG. 14 illustrates a process for performing image stitching for panoramic photography, in accordance with one embodiment.

Referring now to FIG. 14, a process 210 for performing image stitching for panoramic photography is shown in flow chart form, in accordance with one embodiment. FIG. 14 provides greater detail to Image Stitching Step 210, which was described above in reference to FIG. 2. First, process 210 acquires the two or more image frames to be stitched together and places them in an assembly buffer in order to work on them (Step 1400). At this point in the panoramic photography process, the two images may already have been motion filtered, registered, geometrically corrected, etc., as desired, and as described above in accordance with various embodiments.

In prior art panoramic photography post-processing software systems, part of the stitching process comprises blending in the overlapping region between two successively captured image frames in an attempt to hide small differences between the frames. However, this blending process has the consequence of blurring the image in the overlapping region. The inventors have noticed that this approach is not ideal for panoramic photographs where an object of interest is located in the overlapping region, and is particularly undesirable for human faces occurring in the overlapping region, as they can become distorted by the blending process and become very noticeable to a human observer of the panoramic image. Thus, a stitching process according to one embodiment disclosed herein may next locate any objects of interest in the overlapping region between the two image frames currently being stitched (Step 1402). As mentioned above, in one embodiment, the object of interest comprises a human face. Human faces may be located by using any number of well-known face detection algorithms, such as the Viola Jones framework or OpenCV (the Open Source Computer Vision Library). Once the human face or other objects of interest have been located, the process 210 may select the representation of the object of interest from one of the two image frames being stitched based on a criteria (Step 1404). For instance, if the object of interest is a human face, and the human face occurs in two overlapping image frames, the process 210 may select the representation of the face that has both eyes open, or the representation wherein the face is smiling, or the representation with less red eye artifacts. The criteria used and amount of processing involved in selecting the representation of the object of interest may be determined based on the individual application and resources available. In one embodiment, the act of selecting the representation of the face from one of the two images being stitched is based at least in part on a calculated score of the representation of the face in each of the images. The calculation of the score of the representation of a face may comprise, e.g., a consideration of at least one of the following: smile confidence for the face, a detection of red-eye artifacts within the face, or a detection of open or closed eyes within the face.

Once the representation has been selected, the process 210 may blend the image data in the overlapping region between the images according to a chosen blending formula, while excluding the area of the image around the object of interest from the blending process (Step 1406). For example, the image data may be blended across the overlapping region according to an alpha blending scheme or a simple linear or polynomial blending function based on the distance of the pixel being blended from the center of the relevant source image. Once the overlapping region between the images has been blended in all areas not containing objects of interest, e.g., human faces or the like, the process 210 may then add in the selected representation to the overlapping region, optionally employing a soft or 'feathered' edge around the area of the selected representation of the object of interest (Step 1408). Various techniques may be employed to precisely define the area around the object of interest. For example, in the case of a human face, a skin tone mask may be created around the face of interest, e.g., according to techniques disclosed in commonly-assigned U.S. patent application Ser. No. 12/479,651, filed Jun. 5, 2009, which is hereby incorporated by reference in its entirety. In another embodiment, a bounding box circumscribing the area around the object of interest may be defined. In other embodiments, the bounding box may be padded by an additional number of pixels in at least one direction around the object of interest, preferably in all four cardinal direction around the object of interest. A skin tone mask or other such region designated to circumscribe the region around the object of interest may then be transitioned into the blended image data according to a blurring formula, e.g., a "feathering" of the border over a 10-pixel width, or other regional falloff function. The aim of creating a "soft" or "feathered" edge around the inserted region of interest may be employed so that it is not noticeable to an observer of the image as being clearly distinct from the other pixels in the overlapping region. Finally, the resultant stitched image (comprising the previous image, the current image, and the object-of-interest-aware blended overlapping region) may be stored to memory either on the camera device itself or elsewhere (Step 1410).

Figure 15:
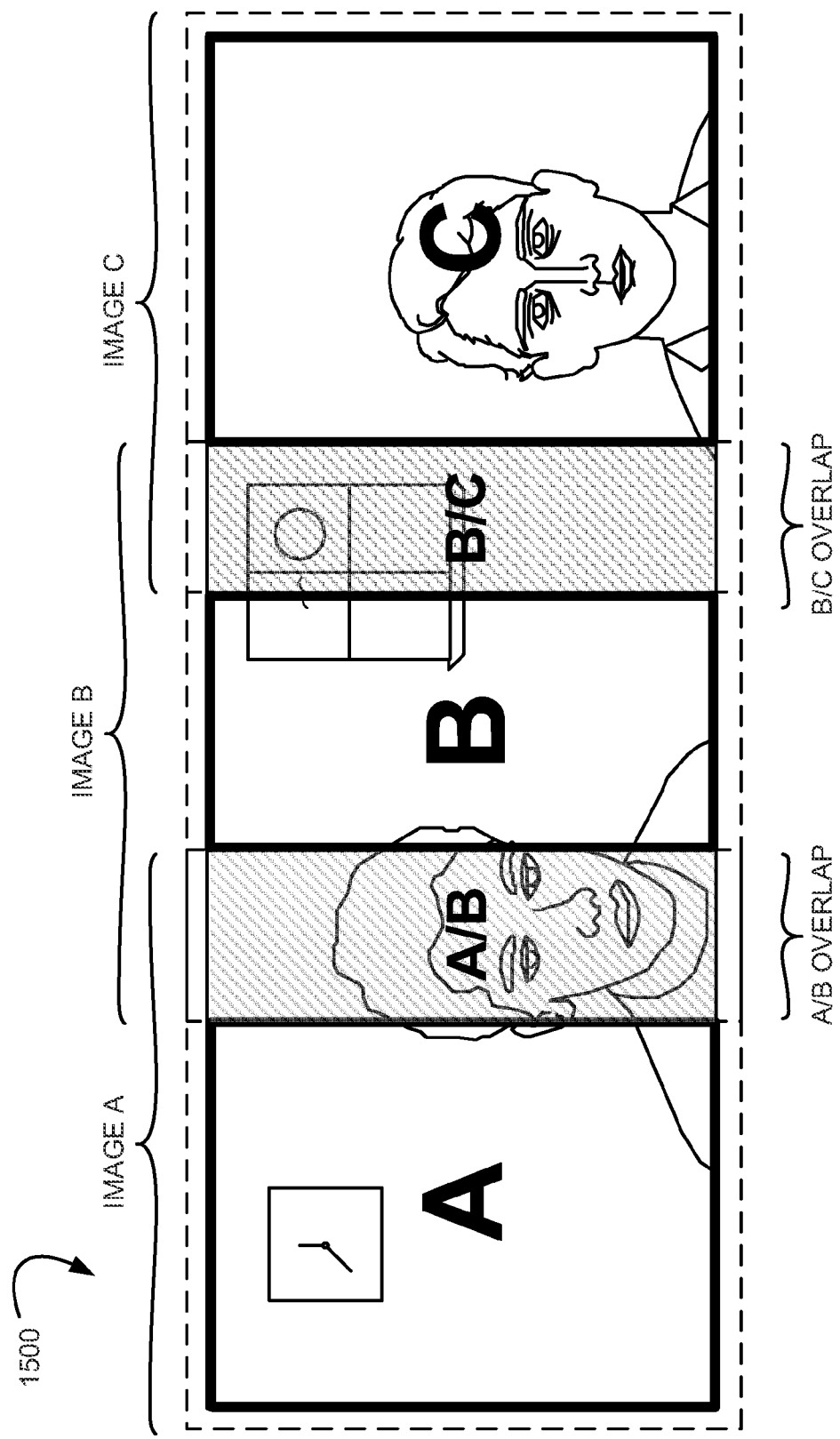
FIG. 15 illustrates an exemplary stitched image, according to a prior art technique.

Referring now to FIG. 15, an exemplary stitched panoramic image 1500 is shown, according to prior art techniques. The panoramic image 1500 shown in FIG. 15 comprises image data from three distinct images: Image A, Image B, and Image C. The outlines of each image are shown in dashed lines, and the extent of each image is shown by a curly brace with a corresponding image label. Additionally, the overlapping regions in the Image are also shown by curly braces with corresponding labels, "A/B OVERLAP" and "B/C OVERLAP." Moving from left to right in the panoramic image 1500, there is a region comprising only image data from Image A (labeled with 'A'), then an overlapping region comprising blended image data from both Images A and B (labeled with 'A/B'), then a region comprising of only image data from Image B (labeled with 'B'), then an overlapping region comprising blended image data from both Images B and C (labeled with 'B/C'), and finally, a region comprising of only image data from Image C (labeled with 'C').

While the panoramic image stitching scheme used to assemble the exemplary panoramic image 1500 described above may work satisfactorily for some panoramic scenes, it may produce noticeably undesirable effects in other panoramic scenes. Particularly, if an object of interest in the image, such as a human face, occurs in one of the overlapping regions, the blending process may result in undesirable visual artifacts. For instance, of the two versions of the object of interest occurring in the overlapping region, one may be in focus and one may be out of focus. Alternately, one may comprise a face with open eyes, and one may comprise a face with closed eyes. Depending on which of the images represented in the overlapping region had the more desirable representation of the object of interest, the blending process may result in a sub-optimal or even strange looking image in the overlapping region, e.g., a face with one eye opened and one eye closed. In the exemplary panoramic image 1500, the human face located in the "A/B OVERLAP" region may result in sub-optimal blending according to prior art stitching techniques, as will be discussed below.

Figure 16:
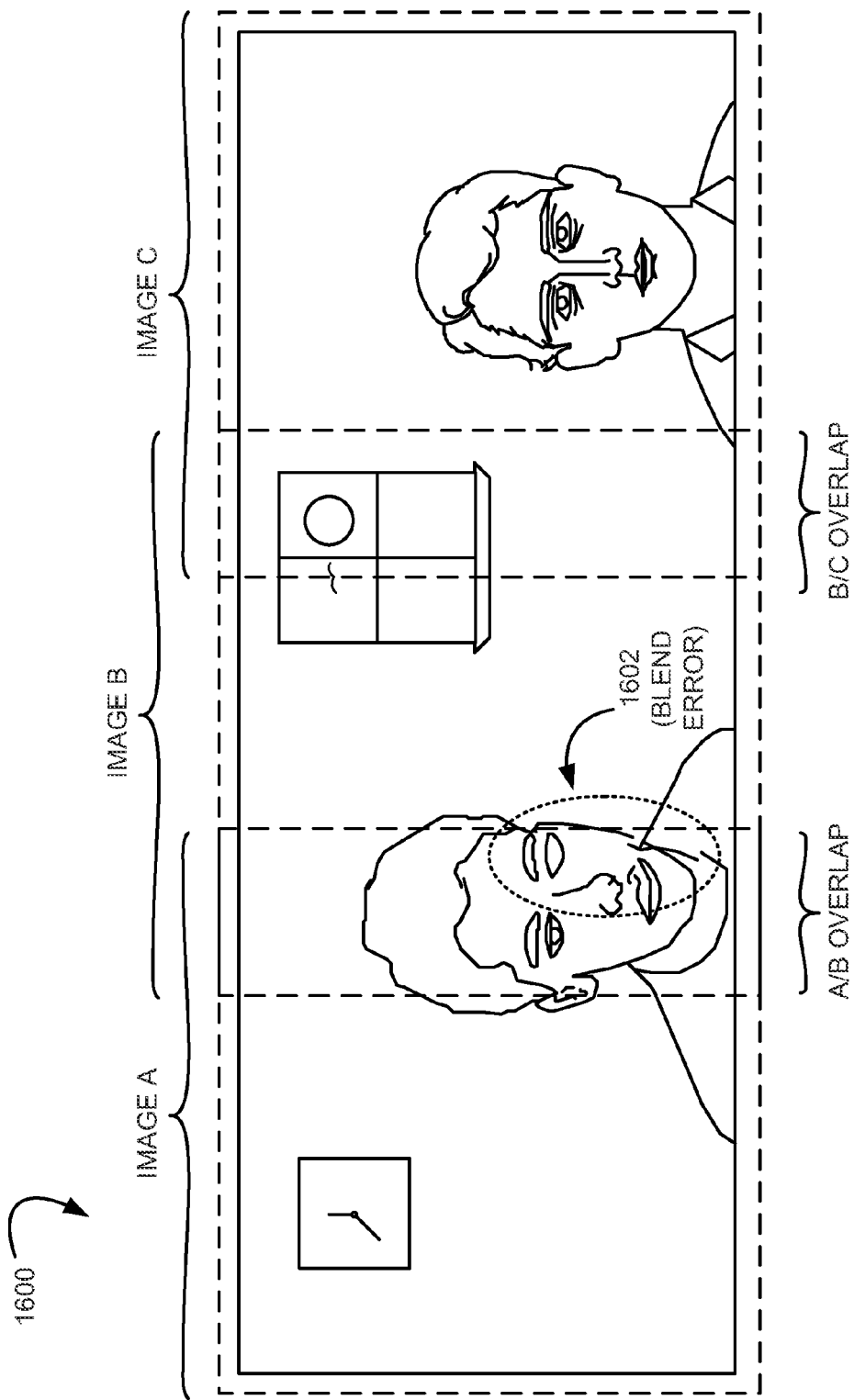
FIG. 16 illustrates an exemplary blending error occurring in a stitched panoramic image assembled according to a prior art technique.

Referring now to FIG. 16, an exemplary blending error 1602 occurring in a stitched panoramic image 1600 assembled according to the prior art techniques is shown. As discussed above with reference to FIG. 15, attempting to blend a human face located in the "A/B OVERLAP" region may result in sub-optimal blending. As shown in FIG. 16, there is an exemplary blending error 1602 within a dashed line circle that is common to panoramic images with human subjects of interest located at the "seams" between two overlapping images in a panoramic image. Specifically, the human subject located in the "A/B OVERLAP" region appeared to have his eyes open when Image A was captured, but blinked at the moment that Image B was being captured, resulting in his eyes being closed in Image B. According to prior art blending techniques, the pixel values from Image A may have dominated in the left hand side of the "A/B OVERLAP" region and then gradually blended into the right hand side of the "A/B OVERLAP" region, wherein the pixel values from Image B dominate in the final stitched image. Because of this blending over the human subject on interest's face, he has ended up with his left eye open and his right eye closed in the final stitched image. This result, and other noticeable blending errors in regions of interest in the image, would preferably be avoided in an intelligent image stitching process.

Figure 17:
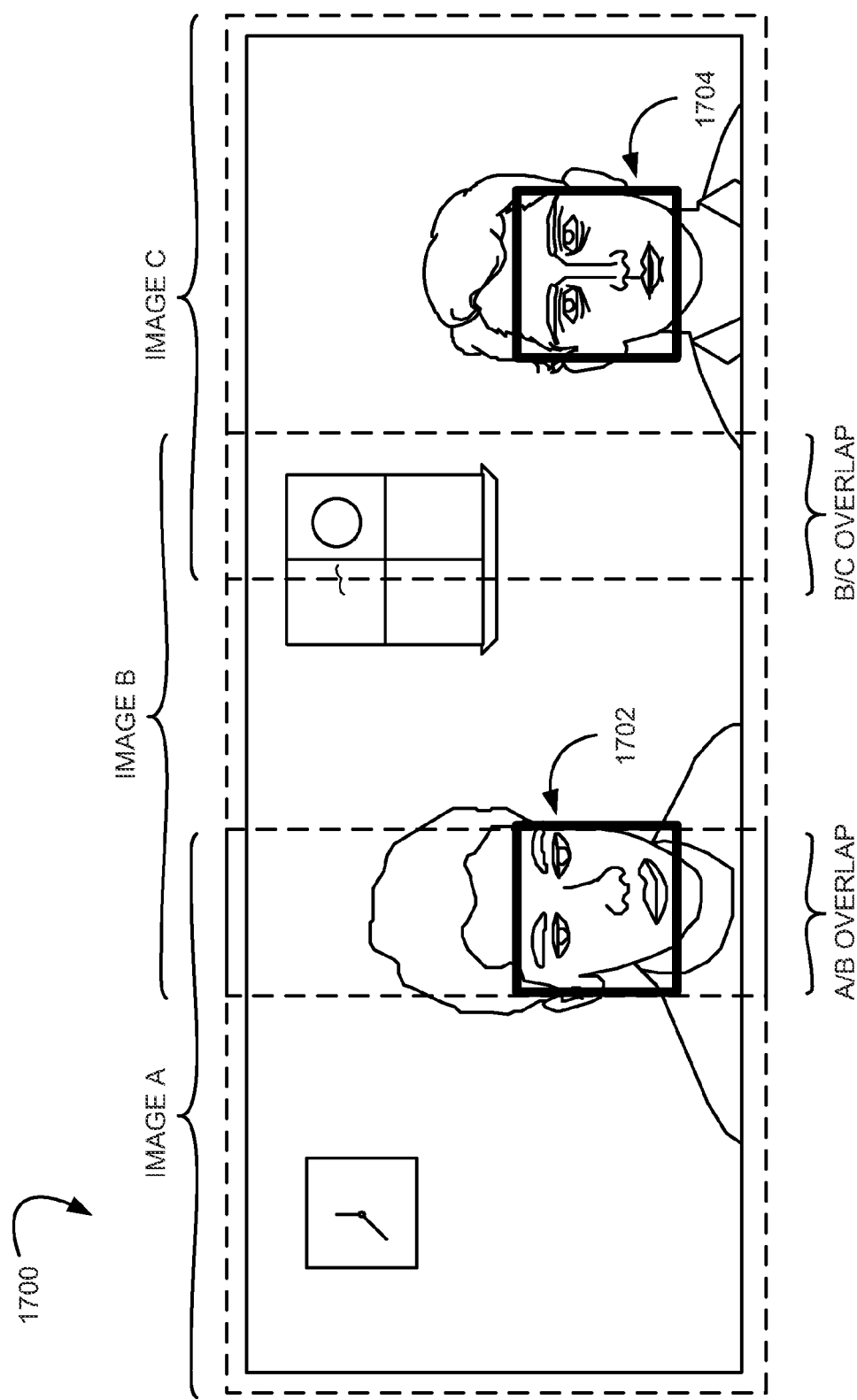
FIG. 17 illustrates exemplary regions of interest in a stitched panoramic image, in accordance with one embodiment.

Referring now to FIG. 17, exemplary regions of interest 1702/1704 in a stitched panoramic image 1700 are shown, in accordance with one embodiment. In order to combat the problems with prior art panoramic stitching techniques described above in reference to FIG. 16, the inventors have employed a "region-of-interest-aware" stitching process 210 that scans the panoramic image components for potential regions of interest to create a scene graph before blending in the overlapping regions between the images. In the exemplary image 1700 shown in FIG. 17, human faces are the particular regions of interest. Thus, after executing a face detection algorithm on the captured image data, exemplary regions of interest 1702/1704 were located, corresponding to the faces of the human subjects in panoramic image 1700. Each region of interest has been outlined in thick black lines. In the exemplary image 1700 shown in FIG. 17, one region of interest 1702 occurs in an overlapping region, whereas the other region of interest, 1704, does not occur in an overlapping region. According to one embodiment of an intelligent image stitching process 210 described herein, these two types of regions may be treated differently in the final image blending process.

Figure 18:
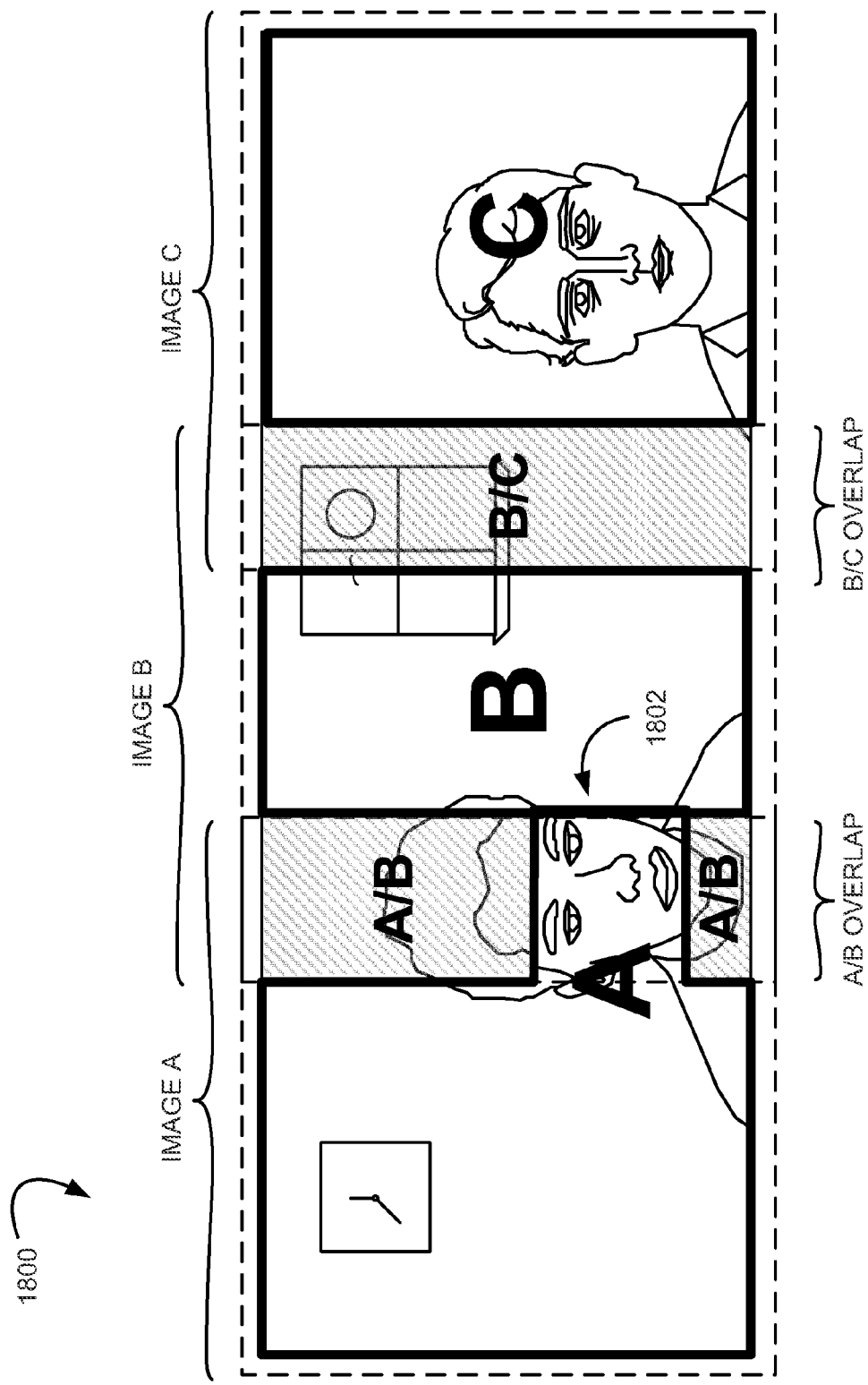
FIG. 18 illustrates an exemplary scene graph for a region-of-interest-aware stitched panoramic image, in accordance with one embodiment.

Referring now to FIG. 18, an exemplary scene graph for a region-of-interest-aware stitched panoramic image 1800 is shown, in accordance with one embodiment. Region of interest 1802 corresponding to the face of a human subject was located and determined to be located within the "A/B OVERLAP" region. As such, the exemplary region-of-interest-aware stitching process 210 determined to use the representation of the face of the human subject entirely from Image A. The decision to use the representation of the face from Image A rather than Image B may be based on any number of factors, such as: the amount of the face actually occurring in the image, the orientation of the face in the image, the focus or exposure characteristics of the face in the image, or even the detection of a smile or open eyes in the image. A face of interest may occur over multiple image slits if image slits are employed in the panoramic photography implementation, but, so long as the face of interest is located in at least one slit, the face detection process can locate the face and exclude the area circumscribing it from potentially unwanted blending.

By selecting the representation of the face from Image A, visually jarring blending errors that may have been caused by blending the representations of the face in Image A and Image B may thus be avoided or diminished. As mentioned above, although FIG. 18 shows region of interest 1802 as being a rectangle inset over the face of interest, more sophisticated masks may be built over the region of interest so that the borders of the region of interest more closely track the outline of the object of interest. In the example of a face, a skin tone mask be used to define the region of interest. Any of a number of known blurring techniques may be used to soften the transition from the edge of the region of interest back into the A/B OVERLAP blended region as well. Comparing FIG. 18 with FIG. 16, the techniques described in reference to FIG. 18 allow the representation of the human subject in the resultant panoramic image to have both eyes open and diminish the effects of any other potential blurring or blending errors over the face of the human subject. This may be especially important, as blending errors in human faces are more noticeable to an observer of a panoramic photograph than blending occurring in a sky or wall, for instance.

Once each of the images to be included in the resultant panoramic image have been stitched together, they may optionally be cropped (Step 214) down to a desired shape, as various alignments and/or perspective corrections applied to the images during the assembly process may have caused the final stitched image to have an irregular shape. Once cropped, the final resultant panoramic image may be stored locally at the camera device or external to the camera device (Step 216). Because of the efficiencies gained using the techniques described herein, panoramic images may be stored and/or displayed on the device in real time as they are being assembled. This type of memory flexibility may also allow the user to define the starting and stopping points for the panoramic sweep on the fly, even allowing for panoramic rotations of greater than 360 degrees.

Figure 19:
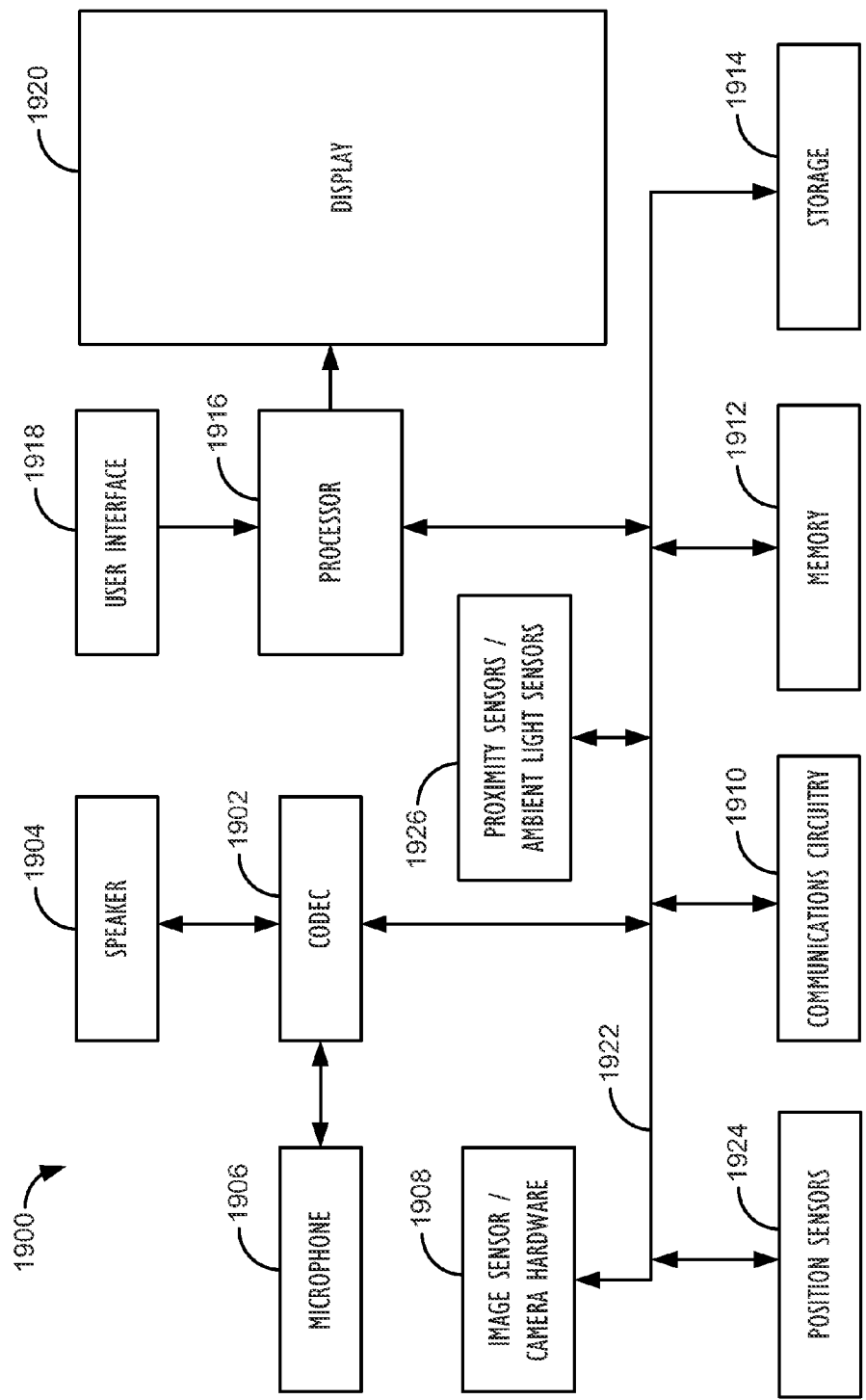
FIG. 19 illustrates a simplified functional block diagram of a representative electronic device possessing a display.

Referring now to FIG. 19, a simplified functional block diagram of a representative electronic device possessing a display 1900 according to an illustrative embodiment, e.g., camera device 308, is shown. The electronic device 1900 may include a processor 1916, display 1920, proximity sensor/ambient light sensor 1926, microphone 1906, audio/video codecs 1902, speaker 1904, communications circuitry 1910, position sensors 1924, image sensor with associated camera hardware 1908, user interface 1918, memory 1912, storage device 1914, and communications bus 1922. Processor 1916 may be any suitable programmable control device and may control the operation of many functions, such as the generation and/or processing of image metadata, as well as other functions performed by electronic device 1900. Processor 1916 may drive display 1920 and may receive user inputs from the user interface 1918. An embedded processor, such a Cortex® A8 with the ARM® v7-A architecture, provides a versatile and robust programmable control device that may be utilized for carrying out the disclosed techniques, (CORTEX® and ARM® are registered trademarks of the ARM Limited Company of the United Kingdom.)

Storage device 1914 may store media (e.g., image and video files), software (e.g., for implementing various functions on device 1900), preference information, device profile information, and any other suitable data. Storage device 1914 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 1912 may include one or more different types of memory which may be used for performing device functions. For example, memory 1912 may include cache, ROM, and/or RAM. Communications bus 1922 may provide a data transfer path for transferring data to, from, or between at least storage device 1914, memory 1912, and processor 1916. User interface 1918 may allow a user to interact with the electronic device 1900. For example, the user input device 1918 can take a variety of forms, such as a button, keypad, dial, a cock wheel, or a touch screen.

In one embodiment, the personal electronic device 1900 may be a electronic device capable of processing and displaying media such as image and video files. For example, the personal electronic device 1900 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicants. As one example, although the present disclosure focused on handheld personal electronic devices, it will be appreciated that the teachings of the present disclosure can be applied to other implementations, such as traditional digital cameras, in exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An image processing method, comprising:
   obtaining a first image at a first time from a device comprising a lens and an image sensor;
   obtaining a second image at a second time from the device;
   receiving positional information from a sensor in the device, the positional information indicating an amount of change in a position of the device between the first and second times;

dividing the first image into a first plurality of image segments;
dividing the second image into a second plurality of image segments;
generating a first plurality of search vectors for the first plurality of image segments, wherein each of the first plurality of search vectors indicates an amount transformation to be applied to one of the first plurality of image segments to provide the image segment's location in the second image;
generating a second plurality of search vectors for the second plurality of image segments, wherein each of the second plurality of search vectors indicates an amount transformation to be applied to one of the second plurality of image segments to provide the image segment's location in the first image;
determining that one or more search vectors from the first and second pluralities of search vectors is consistent with the positional information, wherein the determination includes ignoring any search vector from the first and second pluralities of search vectors that is inconsistent with the positional information;
applying an amount of perspective correction to either the first or the second image; and
registering, in response to the applied perspective correction, the first image with the second image based on the determination.

2. The method of claim 1, wherein the positional information comprises rotational information indicating an amount of rotation of the device between the first and second times.

3. The method of claim 1, wherein obtaining a first image at a first time from a device comprises storing the first image in a memory.

4. The method of claim 1, wherein obtaining a second image at a second time from the device comprises storing the second image in a memory.

5. The method of claim 1, further comprising:
stitching the first image and second image together to create a third image,
wherein the third image comprises:
a first region corresponding to a first portion of only the first image,
an overlap region corresponding to a second portion of the first image overlapped with a first portion of the second image, and
a third region corresponding to a second portion of only the second image.

6. The method of claim 5, further comprising blending together the first and second images in the overlap region.

7. The method of claim 6, further comprising:
cropping the third image; and
storing the cropped third image in a memory.

8. The method of claim 1, wherein receiving positional information from a sensor in the device comprises receiving rotational information from a gyrometer.

9. The method of claim 8, wherein receiving positional information from a sensor in the device further comprises receiving device motion information from an accelerometer.

10. The method of claim 1, wherein applying an amount of perspective correction further comprises performing, on either the first or the second image, one or more of: a cubic interpolation, a bicubic interpolation, a cubic spline, and a bicubic spline.

11. The method of claim 1, wherein applying an amount of perspective correction further comprises applying an image projection correction to either the first or the second image.

12. The method of claim 2, wherein the amount of rotation of the device between the first and second times is correlated to the amount of perspective correction to be applied to either the first or the second image.

13. The method of claim 12, wherein correlation comprises searching a look up table for the indicated rotation amount and identifying an amount of perspective correction corresponding to the rotation amount, and wherein the perspective correction is applied in accordance with the identified amount.

14. The method of claim 13, wherein the amount of perspective correction corresponding to a rotation amount in the look up table is determined based, at least in part, on a characteristic of the lens of the device.

15. A non-transitory program storage device, readable by a programmable control device, comprising instructions stored thereon, the instructions comprising instructions for causing the programmable control device to:
obtain a first image at a first time from a device comprising a lens and an image sensor;
obtain a second image at a second time from the device;
receive positional information from a sensor in the device, the positional information indicating an amount of change in a position of the device between the first and second times;
divide the first image into a first plurality of image segments;
divide the second image into a second plurality of image segments;
generate a first plurality of search vectors for the first plurality of image segments, wherein each of the first plurality of search vectors indicates an amount transformation to be applied to one of the first plurality of image segments to provide the image segment's location in the second image;
generate a second plurality of search vectors for the second plurality of image segments, wherein each of the second plurality of search vectors indicates an amount transformation to be applied to one of the second plurality of image segments to provide the image segment's location in the first image;
determine that one or more search vectors from the first and second pluralities of search vectors is consistent with the positional information, wherein the determination includes ignoring any search vector from the first and second pluralities of search vectors that is inconsistent with the positional information;
apply an amount of perspective correction to either the first or the second image; and
register, in response to the applied perspective correction, the first image with the second image based on the determination.

16. An electronic device, comprising:
memory storing data, the data comprising instructions;
a lens;
an image sensor;
a positional sensor;
a display communicatively coupled to the memory; and
a programmable control device communicatively coupled to the memory, display, positional sensor, and image sensor, wherein the programmable control device is configured to execute one or more of the instructions to:

obtain a first image at a first time from the image sensor;

obtain a second image at a second time from the image sensor;

receive positional information from the positional sensor, the positional information indicating an amount of change in a position of the device between the first and second times;

divide the first image into a first plurality of image segments;

divide the second image into a second plurality of image segments;

generate a first plurality of search vectors for the first plurality of image segments, wherein each of the first plurality of search vectors indicates an amount transformation to be applied to one of the first plurality of image segments to provide the image segment's location in the second image;

generate a second plurality of search vectors for the second plurality of image segments, wherein each of the second plurality of search vectors indicates an amount transformation to be applied to one of the second plurality of image segments to provide the image segment's location in the first image;

determine that one or more search vectors from the first and second pluralities of search vectors is consistent with the positional information, wherein the determination includes ignoring any search vector from the first and second pluralities of search vectors that is inconsistent with the positional information;

apply an amount of perspective correction to either the first or the second image; and register, in response to the applied perspective correction, the first image with the second image based on the determination.

17. The method of claim 1, wherein registering, in response to the applied perspective correction, the first image with the second image based on the determination comprises:

registering, in response to the applied perspective correction, the first image with the second image using the one or more search vectors that are consistent with the positional information and without using any of the ignored search vectors.

18. The method of claim 1, wherein registering, in response to the applied perspective correction, the first image with the second image based on the determination comprises:

determining that a number of ignored search vectors have a predetermined relationship with a threshold number of ignored search vectors; and registering, in response to the applied perspective correction, the first image with the second image without using the one or more search vectors that are consistent with the positional information and without using any of the ignored search vectors.

19. The method of claim 1, wherein determining that one or more search vectors from the first and second pluralities of search vectors is consistent with the positional information comprises:

determining that one or more search vectors from the first and second pluralities of search vectors is consistent with a direction of movement indicated by the positional information.

20. The method of claim 1, wherein the change in the position of the device is caused by a user of the device.

21. The method of claim 1, wherein the amount of perspective correction is based, at least in part, on one or more of:

a focus level of the lens, a resolution of the image sensor, and the received positional information.

22. The non-transitory program storage device of claim 15, wherein the positional information comprises rotational information indicating an amount of rotation of the device between the first and second times.

23. The non-transitory program storage device of claim 15, wherein the instructions for causing the programmable control device to obtain a first image at a first time from a device comprise instructions for causing the programmable control device to store the first image in a memory.

24. The non-transitory program storage device of claim 15, wherein the instructions for causing the programmable control device to obtain a second image at a second time from the device comprise instructions for causing the programmable control device to store the second image in a memory.

25. The non-transitory program storage device of claim 15, wherein the instructions comprise additional instructions for causing the programmable control device to:

stitch the first image and second image together to create a third image, wherein the third image comprises:

a first region corresponding to a first portion of only the first image, an overlap region corresponding to a second portion of the first image overlapped with a first portion of the second image, and a third region corresponding to a second portion of only the second image.

26. The non-transitory program storage device of claim 25, wherein the instructions comprise additional instructions for causing the programmable control device to:

blend together the first and second images in the overlap region.

27. The non-transitory program storage device of claim 26, wherein the instructions comprise additional instructions for causing the programmable control device to:

crop the third image; and store the cropped third image in a memory.

28. The non-transitory program storage device of claim 15, wherein the instructions for causing the programmable control device to receive positional information from a sensor in the device comprise instructions for causing the programmable control device to receive rotational information from a gyrometer.

29. The non-transitory program storage device of claim 28, wherein the instructions for causing the programmable control device to receive positional information from a sensor in the device further comprise instructions for causing the programmable control device to receive device motion information from an accelerometer.

30. The non-transitory program storage device of claim 15, wherein the instructions for causing the programmable control device to apply an amount of perspective correction further comprise instructions for causing the programmable control device to perform, on either the first or the second image, one or more of: a cubic interpolation, a bicubic interpolation, a cubic spline, and a bicubic spline.

31. The non-transitory program storage device of claim 15, wherein the instructions for causing the programmable control device to apply an amount of perspective correction further comprise instructions for causing the programmable control device to apply an image projection correction to either the first or the second image.

32. The non-transitory program storage device of claim 22, wherein the amount of rotation of the device between the first and second times is correlated to the amount of perspective correction to be applied to either the first or the second image.

33. The non-transitory program storage device of claim 32, wherein correlation comprises instructions for causing the programmable control device to search a look up table for the indicated rotation amount and identifying an amount of perspective correction corresponding to the rotation amount, and wherein the perspective correction is applied in accordance with the identified amount.

34. The non-transitory program storage device of claim 33, wherein the amount of perspective correction corresponding to a rotation amount in the look up table is determined based, at least in part, on a characteristic of the lens of the device.

35. The non-transitory program storage device of claim 15, wherein the instructions for causing the programmable control device to register, in response to the applied perspective correction, the first image with the second image based on the determination comprise instructions for causing the programmable control device to:
register, in response to the applied perspective correction, the first image with the second image using the one or more search vectors that are consistent with the positional information and without using any of the ignored search vectors.

36. The non-transitory program storage device of claim 15, wherein the instructions for causing the programmable control device to register, in response to the applied perspective correction, the first image with the second image based on the determination comprise instructions for causing the programmable control device to:
determine that a number of ignored search vectors have a predetermined relationship with a threshold number of ignored search vectors; and
register, in response to the applied perspective correction, the first image with the second image without using the one or more search vectors that are consistent with the positional information and without using any of the ignored search vectors.

37. The non-transitory program storage device of claim 15, wherein the instructions for causing the programmable control device to determine that one or more search vectors from the first and second pluralities of search vectors is consistent with the positional information comprise instructions for causing the programmable control device to:
determine that one or more search vectors from the first and second pluralities of search vectors is consistent with a direction of movement indicated by the positional information.

38. The non-transitory program storage device of claim 15, wherein the change in the position of the device is caused by a user of the device.

39. The non-transitory program storage device of claim 15, wherein the amount of perspective correction is based, at least in part, on one or more of:
a focus level of the lens,
a resolution of the image sensor, and
the received positional information.

40. The electronic device of claim 16, wherein the positional information comprises rotational information indicating an amount of rotation of the device between the first and second times.

41. The electronic device of claim 16, wherein the programmable control device being configured to execute one or more of the instructions to obtain a first image at a first time from a device comprises the programmable control device being configured to execute one or more of the instructions to store the first image in a memory.

42. The electronic device of claim 16, wherein the programmable control device being configured to execute one or more of the instructions to obtain a second image at a second time from the device comprises the programmable control device being configured to execute one or more of the instructions to store the second image in a memory.

43. The electronic device of claim 16, wherein the instructions comprise additional instructions and wherein the programmable control device is further configured to execute one or more of the additional instructions to:
stitch the first image and second image together to create a third image,
wherein the third image comprises:
a first region corresponding to a first portion of only the first image,
an overlap region corresponding to a second portion of the first image overlapped with a first portion of the second image, and
a third region corresponding to a second portion of only the second image.

44. The electronic device of claim 43, wherein the instructions comprise additional instructions and wherein the programmable control device is further configured to execute one or more of the additional instructions to:
blend together the first and second images in the overlap region.

45. The electronic device of claim 44, wherein the instructions comprise additional instructions and wherein the programmable control device is further configured to execute one or more of the additional instructions to:
crop the third image; and
store the cropped third image in a memory.

46. The electronic device of claim 16, wherein the programmable control device being configured to execute one or more of the instructions to receive positional information from a sensor in the device comprises the programmable control device being configured to execute one or more of the instructions to receive rotational information from a gyrometer.

47. The electronic device of claim 46, wherein the programmable control device being configured to execute one or more of the instructions to receive positional information from a sensor in the device further comprises the programmable control device being configured to execute one or more of the instructions to receive device motion information from an accelerometer.

48. The electronic device of claim 16, wherein the programmable control device being configured to execute one or more of the instructions to apply an amount of perspective correction further comprises the programmable control device being configured to execute one or more of the instructions to perform, on either the first or the second image, one or more of: a cubic interpolation, a bicubic interpolation, a cubic spline, and a bicubic spline.

49. The electronic device of claim 16, wherein the programmable control device being configured to execute one or more of the instructions to apply an amount of perspective correction further comprises the programmable control device being configured to execute one or more of the instructions to apply an image projection correction to either the first or the second image.

50. The electronic device of claim 40, wherein the amount of rotation of the device between the first and second times is correlated to the amount of perspective correction to be applied to either the first or the second image.

51. The electronic device of claim 50, wherein correlation comprises the programmable control device being configured to execute one or more of the instructions to search a look up table for the indicated rotation amount and identifying an amount of perspective correction corresponding to the rotation amount, and wherein the perspective correction is applied in accordance with the identified amount.

52. The electronic device of claim 51, wherein the amount of perspective correction corresponding to a rotation amount in the look up table is determined based, at least in part, on a characteristic of the lens of the device.

53. The electronic device of claim 16, wherein the programmable control device being configured to execute one or more of the instructions to register, in response to the applied perspective correction, the first image with the second image based on the determination comprises the programmable control device being configured to execute one or more of the instructions to:
  register, in response to the applied perspective correction, the first image with the second image using the one or more search vectors that are consistent with the positional information and without using any of the ignored search vectors.

54. The electronic device of claim 16, wherein the programmable control device being configured to execute one or more of the instructions to register, in response to the applied perspective correction, the first image with the second image based on the determination comprises the programmable control device being configured to execute one or more of the instructions to:
  determine that a number of ignored search vectors have a predetermined relationship with a threshold number of ignored search vectors; and
  register, in response to the applied perspective correction, the first image with the second image without using the one or more search vectors that are consistent with the positional information and without using any of the ignored search vectors.

55. The electronic device of claim 16, wherein the programmable control device being configured to execute one or more of the instructions to determine that one or more search vectors from the first and second pluralities of search vectors is consistent with the positional information comprises the programmable control device being configured to execute one or more of the instructions to:
  determine that one or more search vectors from the first and second pluralities of search vectors is consistent with a direction of movement indicated by the positional information.

56. The electronic device of claim 16, wherein the change in the position of the device is caused by a user of the device.

57. The electronic device of claim 16, wherein the amount of perspective correction is based, at least in part, on one or more of:
  a focus level of the lens,
  a resolution of the image sensor, and
  the received positional information.

* * * * *